(12) United States Patent
Kuwahara et al.

(10) Patent No.: US 6,504,800 B1
(45) Date of Patent: Jan. 7, 2003

(54) OPTICAL DISK AND OPTICAL APPARATUS

(75) Inventors: Maho Kuwahara, Kawasaki; Shintaro Takehara, Yokohama, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/343,470

(22) Filed: Jun. 30, 1999

(30) Foreign Application Priority Data

Jun. 30, 1998 (JP) .......................................... 10-184908
Jun. 30, 1998 (JP) .......................................... 10-199515

(51) Int. Cl.⁷ ................................................ G11B 7/00
(52) U.S. Cl. .................. 369/44.26; 369/47.3; 369/47.5; 369/275.3; 369/275.4
(58) Field of Search .......................... 369/44.26, 44.34, 369/47.23, 47.28, 47.3, 47.5, 47.51, 53.22, 53.31, 59.25, 275.3, 275.4, 53.37

(56) References Cited

U.S. PATENT DOCUMENTS

| | | | | |
|---|---|---|---|---|
| 5,553,051 A | * | 9/1996 | Sugiyama et al. | |
| 5,808,988 A | * | 9/1998 | Maeda et al. | |
| 5,812,520 A | * | 9/1998 | Nakayama et al. | |
| 5,892,752 A | * | 4/1999 | Matsuura | |
| 6,282,166 B1 | * | 8/2001 | Akiyama et al. | |
| 6,292,458 B1 | * | 9/2001 | Eguchi et al. | |
| 6,295,271 B1 | * | 9/2001 | Inui et al. | |
| 6,301,208 B1 | * | 10/2001 | Sugaya et al. | |

* cited by examiner

*Primary Examiner*—W. R. Young
(74) *Attorney, Agent, or Firm*—Pillsbury Winthrop LLP

(57) ABSTRACT

An optical disk includes land and groove tracks which are alternately arranged, a land portion which is substantially flush with the land track and separates the groove track, a set of embossed pits which is formed in a boundary between the land portion and one of the land tracks located on two sides of the groove track in which the land portion is formed, and a record/reproduction interruption portion which is formed in a record area formed on the land track located on a side on which the embossed pits are not formed and adjacent to the land portion and on/from which no data is recorded/reproduced. Data are recorded/reproduced in units of ECC blocks each having a plurality of sectors.

19 Claims, 12 Drawing Sheets

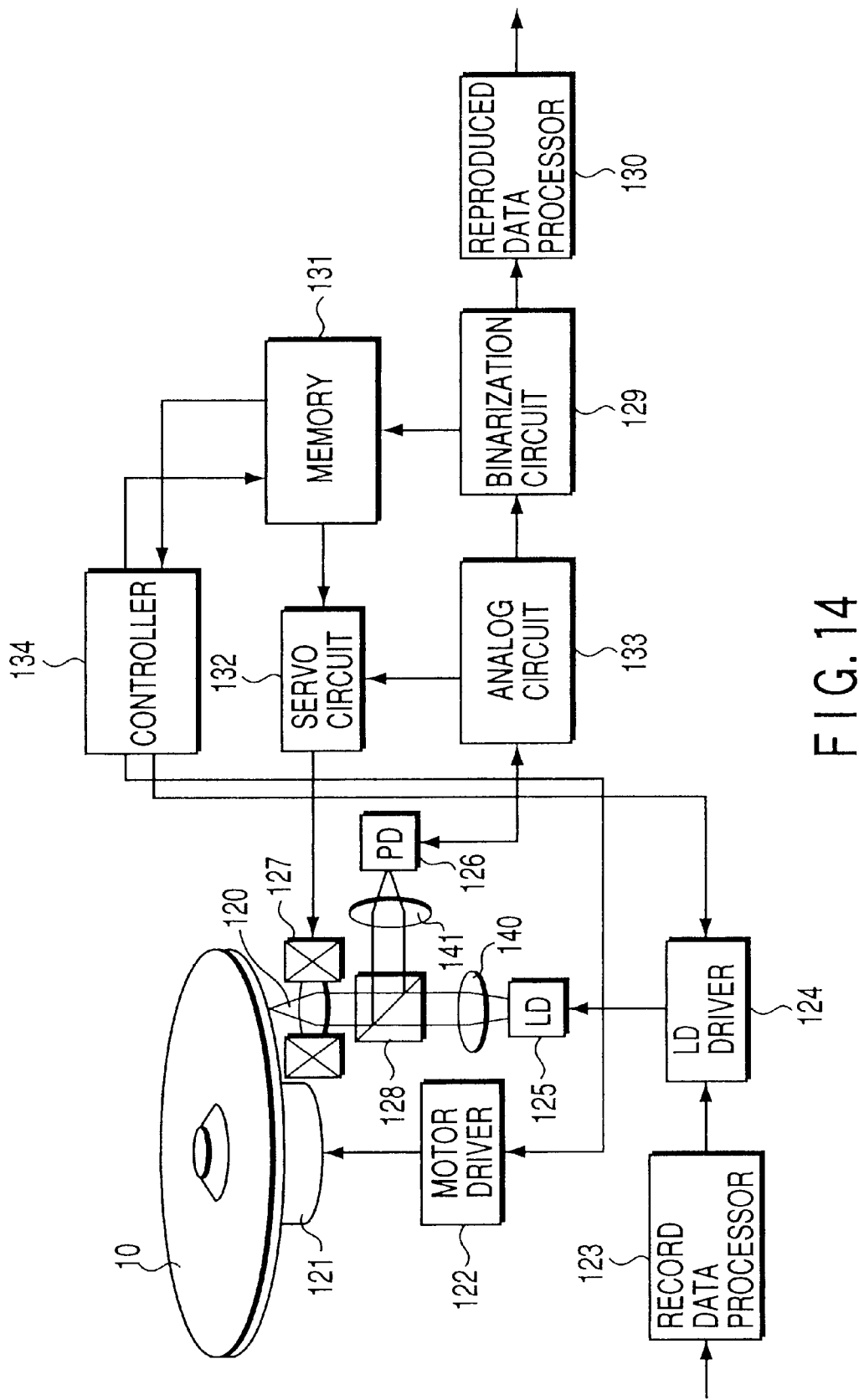
F I G. 14

OPTICAL DISK AND OPTICAL APPARATUS

BACKGROUND OF THE INVENTION

The present invention relates to a data writable and readable optical disk and an optical disk apparatus for driving the optical disk.

A rewritable optical disk allows repetitive writing and reading of data at arbitrary positions. In general, data are recorded on such an optical disk in units of sectors. In this case, sector address information and error correction coded data are written in each sector.

In contrast to this, on a large-capacity rewritable optical disk called a DVD-RAM, which has recently been standardized to have a diameter of 120 mm, in order to improve the data error correction performance, data are written in units of ECC blocks each obtained by performing error correction coding throughout a plurality of sectors. The same writing (recording) method is used for a DVD-ROM as a read-only optical disk, in which data are written in units of ECC blocks each having 16 sectors each including 2,048 bytes. In the DVD-ROM, error correction coding is applied to ECC blocks and sector address information as well as data, thus realizing a structure that is highly resistant to errors.

As an optical disk on which data are recorded in units of ECC blocks in the above manner, the following optical disk has been proposed, together with an optical disk apparatus. According to this proposal, the optical disk is designed to write/read out (record/reproduce) data in units of ECC blocks each having a plurality of sectors by using at least a land track or groove track. A separation portion is formed on a groove track to be flush with a land track surface. The position information of an ECC block (information representing the address of the ECC block or the boundary between ECC blocks) is recorded as embossed pits on the boundary between this separation portion and the land track. Error correction coded data is written in each sector of the ECC block on the basis of the position information obtained from the embossed pits, together with sector address information representing the address of each sector in which data is written.

As described above, the position information of each ECC block (ECC block) is recorded as embossed pits on an optical disk. When data of each sector of the ECC block and the address information of each sector are recorded on the optical disk on the basis of this position information, the sector length on the disk changes due to variations in the rotational speed of the disk in data record/reproduce operation or decentering, or random shifts of the record position in the use of a phase change recording scheme and deterioration at the beginning/end of data occur. For this reason, to cope with random shifts and deterioration at the beginning/end of data, buffer areas are formed in units of ECC blocks. Since the buffer areas are reduced as compared with a conventional optical disk on which address information is recorded as embossed pits in units of sectors, the data record area can be increased accordingly, thus increasing the format efficiency.

In the above arrangement, however, buffer areas are formed in units of ECC blocks, and data are recorded in units of ECC blocks. For this reason, separation portions in which embossed pits are formed cannot be aligned in the radial direction of the disk, and general data record/reproduce operation is performed on tracks adjacent to tracks in which embossed pits are formed. If, therefore, the recording density increases (the track pitch decreases) in the tracking direction, crosstalk between embossed pits and record data on adjacent tracks may present a problem. When land tracks adjacent to a separation portion in which embossed pits are formed are to be reproduced, the crosstalk suppression effect in the land/groove arrangement cannot be obtained. This may affect reproduction of data.

Consider land tracks adjacent to a separation portion in which embossed pits are formed. Although a groove is present on one side, the land on the other side is flat. In this case, a problem regarding record/reproduction operation itself, i.e., a problem that an accurate shape record mark cannot be formed or the DC component of a reproduction signal may greatly change may arise, unlike the record/reproduction characteristics of a conventional land track in which groove tracks are present on the two sides of embossed pits.

In addition, since the land portion on this groove track separation portion is spread, the shape of a record mark distorts, and the mark center deviates from the center of the land track. As a result, the intensity of reflected light in reproduction operation differs from that from a land track having groove tracks on its two sides in reproduction operation. It may therefore become difficult to stably perform data record/reproduction operation.

BRIEF SUMMARY OF THE INVENTION

It is an object of the present invention to provide an optical disk and optical disk apparatus which can increase a format efficiency and record data at arbitrary positions without any waste.

It is another object of the present invention to provide an optical disk apparatus which can record/reproduce data more stably on/from a land track partial region adjacent to a land portion of a groove track separation portion on an optical disk.

According to the present invention, there is provided an optical disk on/from which data can be recorded/reproduced in units of ECC blocks each constituted by a plurality of sectors, comprising a plurality of land tracks and groove tracks which are alternately arranged in a radial direction of the optical disk, a land portion which is formed on each of the groove tracks to separate a corresponding groove track of the groove tracks and is substantially flush with the land tracks, a set of embossed pits which is formed in units of ECC blocks in a boundary between the land portion and one of the land tracks located on two sides of the groove track in which the land portion is formed, and a record/reproduction interruption portion which is formed in a data area adjacent to the land portion and on the other of the land tracks located on the two sides on a side on which the set of embossed pits are not formed, no data being recorded/reproduced on/from the record/reproduction interruption portion.

In addition, according to the present invention, there is provided optical disk apparatus for recording/reproducing data on/from at least one of land and groove tracks on an optical disk in units of ECC blocks each having a plurality of sectors, comprising an optical head which records/plays back information on/from at least one of the land and groove tracks on the optical disk, and a processor which detects logical position information by which the ECC blocks are separated on the basis of position information obtained by a set of embossed pits and a record/reproduction interruption portion between the ECC blocks and performs a processing of temporarily interrupting recording/reproduction of data on/from the record/reproduction interruption portion, when data of each sector and address information of each sector are recorded/reproduced on the basis of the position information read by the optical head from the set of embossed pits formed in a boundary between each of the land tracks and a land portion for separating a corresponding one of the groove tracks on the optical disk.

When position information by which an ECC block is separated into a plurality of blocks is to be generated, a logical position at which the ECC block is separated may be located immediately before a sync pattern in a data area, immediately before sector address information, or immediately after the sector address information.

When the position information or the like of an ECC block on an optical disk is recorded as embossed pits, and the data of each sector of the ECC block and the address information of each sector are to be recorded on the basis of this position information, logical position information by which the ECC block is separated into a plurality of blocks and a record/reproduction interruption portion inserted between the plurality of separated blocks are generated on the basis of the position information of the ECC block, and recording in the record/reproduction interruption portion is temporarily interrupted. With this arrangement, buffer areas for coping with changes in actual sector length on the disk which are caused by variations in the rotational speed of the disk, decentering, and the like in data record/reproduction operation, random shifts of a record position in the use of the phase change recording scheme, and deterioration at the beginnings and end of data may be formed in units of blocks obtained by separating each ECC block.

In addition, since no data is recorded/reproduced on/from a track adjacent to a track in which embossed pits are present, this optical disk is free from any problems associated with crosstalk and data record/reproduction characteristics, and hence can increase the format efficiency as compared with a conventional rewritable optical disk.

Furthermore, according to the present invention, there is provided an optical disk apparatus for recording/reproducing information on/from an optical disk having a plurality of land tracks and groove tracks which are alternately arranged adjacent to one another, and a plurality of land portions which are substantially flush with the land tracks and separate the groove tracks, respectively, and a plurality of sets of embossed pits each which are formed in a boundary between one of the land tracks located on two sides of each of the groove tracks in which the land portions are formed, respectively, and a corresponding one of the land portions and represent position information, comprising a driving section for rotating/driving the optical disk, an optical head which performs selectively recording and reproducing information on/from the optical disk by irradiating the optical disk with a light beam, and a control section which controls tracking so that a position of the light beam is fixed to a predetermined position in a radial direction of the optical disk in a period during which the light beam is positioned in a partial portion of one of the land tracks that is adjacent to another one of the land portions that is on a side opposite to a side of the boundary on which the embossed pits are formed.

More specifically, the operation state control section controls the tracking control system to fix the position of a light beam in the radial direction of the disk to a predetermined position (e.g., a position at which the light beam is offset to the groove track adjacent to the land track partial region by a predetermined amount) in a period during which the light beam is positioned in the land track partial region adjacent to the groove track separation portion on the opposite side to the side where the embossed pits are formed. In addition, during this period, the operation state control section performs (a) control to decrease the intensity of the record light beam in the recording system by a predetermined value, or (b) control to decrease at least one of the intensity of a reproduction light beam in the reproduction system and a gain and DC offset amount to be provided for a reproduction signal by a predetermined value.

If the position of a light beam in the radial direction of the disk is fixed in the land track partial region adjacent to the groove track separation portion on the opposite side to the side where the embossed pits are formed, this operation can prevent disturbance of tracking servo control. In addition, since the light beam passes through the land track partial region in a short period of time, even if the position of the light beam is fixed in the radial direction of the disk, no problem arises. Stable record/reproduction operation can therefore be performed even in such a land track partial region.

In this case, the position of a light beam may be fixed in the radial direction of the disk immediately before it reaches the land track partial region. However, when the position of the light beam is fixed, the light beam is preferably offset, by a predetermined amount, to the groove track adjacent to the land track partial region.

Since one side of this land track partial region in the radial direction of the disk is a land portion of a groove track separation portion, the land track partial region easily diffuses heat generated upon irradiation of a light beam as compared with a general land track having the groove tracks formed on its two sides. The record mark therefore tends to distort. This distortion of the record mark tends to lead to a change in shape and an increase in the size of the mark. For this reason, the distortion of the record mark can be reduced by decreasing the intensity of a record light beam in the land track partial region. In this case, the distortion of the record mark can be prevented more effectively by offsetting the light beam to the groove track adjacent to the land track partial region.

In addition, the record mark in such a land track partial region tends to distort. For this reason, in reproduction of data from the land track partial region, the reflected light intensity increases due to the distortion of the record mark and the distortion of a reproduction signal increases as compared with reproduction of data from other areas. In consideration of the above situation, in order to prevent this problem, in the land track partial region, the intensity of a reproduction light beam is set lower than that in reproduction of data from other general land tracks or groove tracks. With this control, the distortion of the reproduction signal due to the distortion of the record mark can be reduced.

In addition, in such a land track partial region, the mark center deviates from the track center due to the distortion of the record mark, resulting in an increase in the distortion of the reproduction signal. Such distortion of the reproduction signal can be reduced by offsetting the light beam to the groove track adjacent to the land track partial region.

Obviously, the same effect as described above can be obtained by decreasing the gain or DC offset amount to be provided for a reproduction signal in the amplifier in the signal processing system instead of decreasing the intensity of a reproduction light beam.

In the present invention, a control position at which the operation states of the recording or reproduction system are switched, i.e., the position of a land track partial region adjacent to a groove track separation portion on the opposite side to the side where embossed pits are formed (in other words, the position of a land track partial region which is adjacent to a large portion of a groove track separation portion and does not share embossed pits) may be managed in accordance with position information stored in the memory in advance or may be calculated.

As described above, according to the present invention, the position of a land track partial region which is adjacent to a land portion of a groove track separation portion and does not share embossed pits 16 is obtained, and the above switching control is performed on the basis of the obtained position, thereby performing better record/reproduction operation in this land track partial region.

BRIEF DESCRIPTION OF THE SEVERAL VIEWS OF THE DRAWING

FIG. 14 is a block diagram showing the arrangement of an optical disk apparatus according to another embodiment of the present invention;

DETAILED DESCRIPTION OF THE INVENTION

Embodiments of the present invention will be described in detail below with reference to the views of the accompanying drawing.

An optical disk according to an embodiment of the present invention will be described with reference to FIGS. 1 to 3B.

Figure 1:
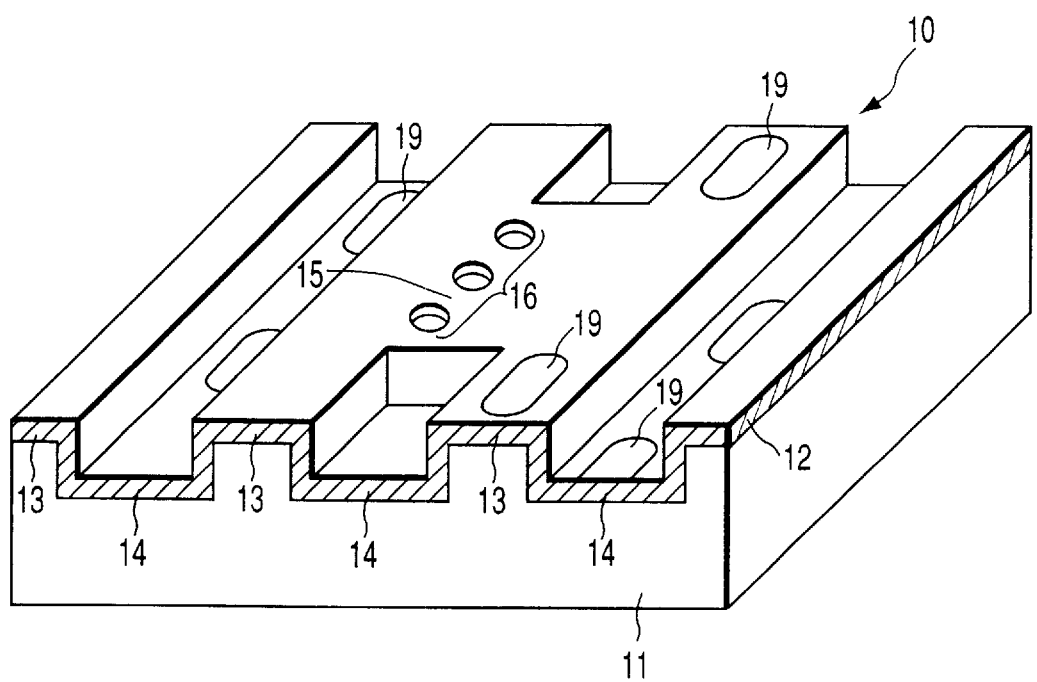
FIG. 1 is an enlarged perspective view of part of an optical disk according to an embodiment of the present invention.
Figures 3A, 3B:
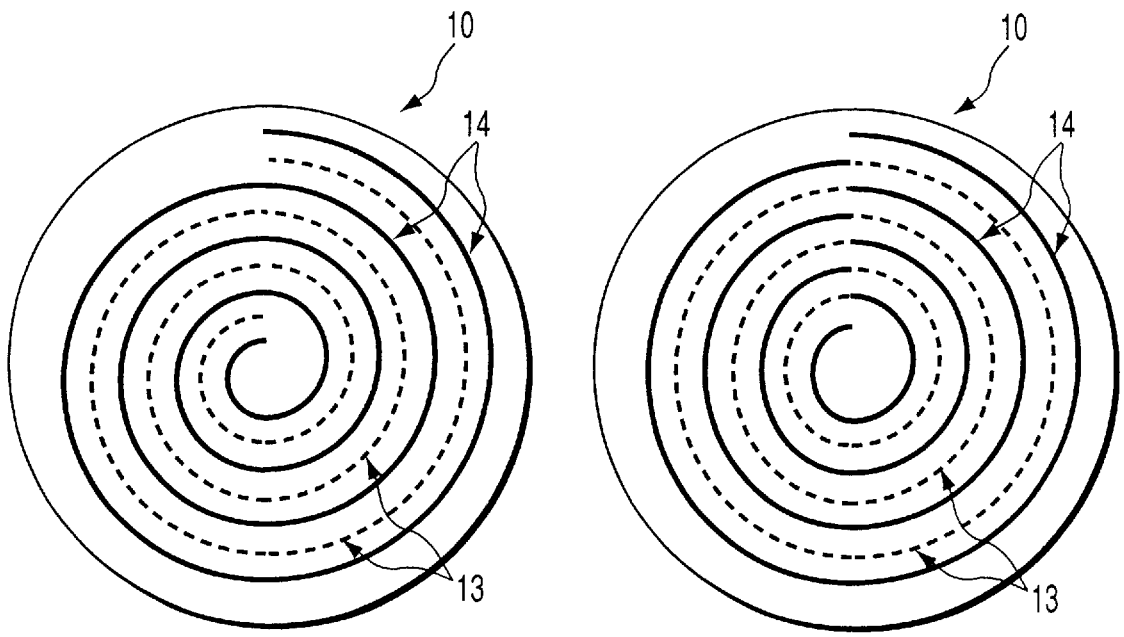
FIGS. 3A and 3B are plan views showing spiral formats on the optical disk.

As shown in FIG. 1, a rewritable record film 12, e.g., a phase change film, is formed on a disk substrate 11 of an optical disk 10. As shown in FIGS. 3A and 3B, a land track 13 and groove track 14 are spirally formed on the disk substrate 11. The two tracks are adjacent to each other in the radial direction of the disk. Layout methods for the land track 13 and the groove track 14 include a double spiral scheme of laying out the land track 13 and the groove track 14 on two parallel spirals, as shown in FIG. 3A, and a single spiral scheme of spirally and continuously laying out the land track 13 and the groove track 14, as shown in FIG. 3B. The double spiral scheme shown in FIG. 3A will be described in this embodiment.

Figure 2:
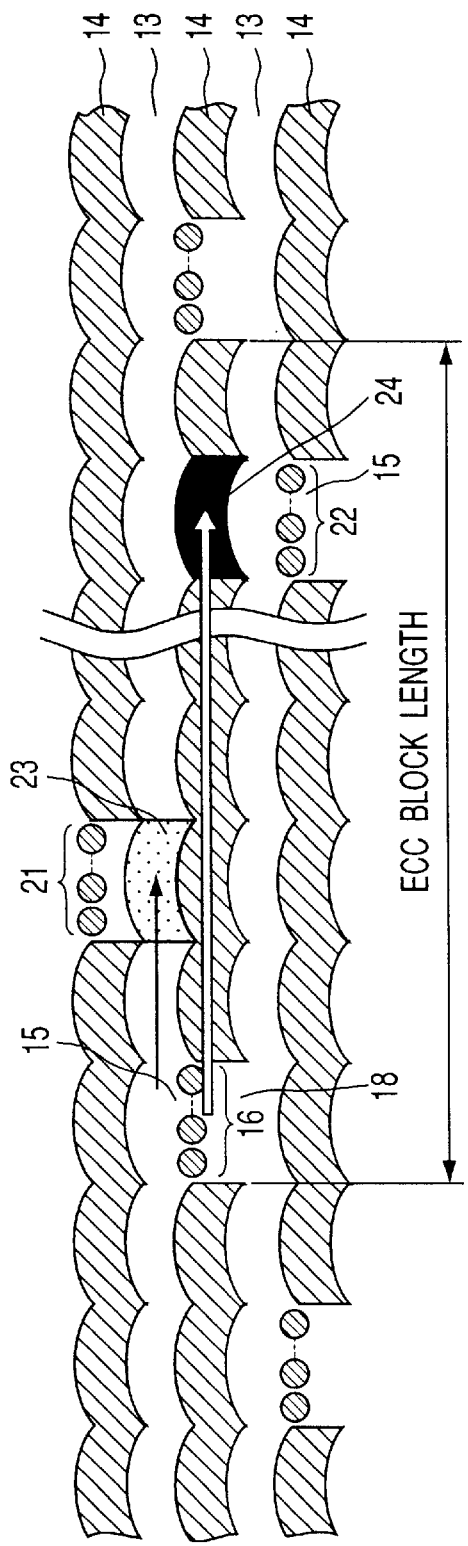
FIG. 2 is a plan view showing a track pattern on the optical disk.

In this embodiment, as shown in FIG. 2, the land track 13 and the groove track 14 are wobbled at a constant cycle. For the sake of simplicity, FIGS. 3A and 3D show tracks that are not wobbled. In practice, however, the tracks are wobbled at a predetermined constant cycle.

As shown in FIGS. 1 and 2, the groove track 14 is separated halfway, and the resultant separation portion is used as a land portion 15 flush with the land track 13. Embossed pits 16 are formed in the surface of the boundary between the land portion 15 and the land track 13. In this case, the embossed pits 16 are formed in the boundary between either one of the land tracks 13 located on the two sides of the groove track 14 on which the land portion 15 is formed and the land portion 15. These embossed pits 16 represent position information or the like on an ECC block (to be referred to as an ECC block hereinafter) on the land track 13 and groove track 14 located on the two sides of the embossed pits 16. More specifically, the embossed pits 16 represent the address or boundary information of an ECC block and are formed in a cycle of ECC block length. In addition, header areas and record areas (data areas) are formed in units of ECC blocks.

As shown in FIG. 2, a land record area portion 23 which is formed on the land track 13 located on the side where embossed pits 21 are not formed and is adjacent to the land portion 15 serves as a record/reproduction interruption portion. No data is recorded/reproduced on/from this record/reproduction interruption portion. A groove record area portion 24 also serves as a record/reproduction interruption portion on/from which no data is recorded/reproduced. The groove record area portion 24 is formed on the groove track 14 adjacent to the land track 13 located on the side where embossed pits 22 are formed and opposes the land portion 15.

More specifically, certified processing is performed for an optical disk on which no record mark is recorded before shipment to form such record/reproduction interruption portions. In this processing, when a mark 19 are written on tracks of an optical disk, no marks are written on the record area portions 23 and 24, thereby forming record/reproduction interruption portions.

That is, the record/reproduction area of each ECC block formed on the optical disk includes record/reproduction interruption portions for separation of ECC blocks. When a format for recording is determined, logical position information for separating an ECC block into two blocks is generated from the position information of an ECC block.

As shown in FIGS. 1 and 2, the embossed pits 16, 21, and 22 not arranged in a line in the radial direction of the optical disk, but are shifted from each other. Although FIGS. 1 and 2 show the round pits, the shapes of pits are not limited to this. For example, oblong or elliptic pits or a combination of oblong and elliptic pits may be formed.

By forming the embossed pits 16 representing the position information of each ECC block in units of ECC blocks and temporarily interrupting recording or reproduction in the areas 23 and 24 in FIG. 2, the problems associated with crosstalk and recording/reproduction of data can be solved while a high format efficiency is maintained. This point will be described in detail later.

Since each set of the embossed pits 16, 21 and 22 is formed in the surface of the boundary between the land portion 15 which separate the groove track 14 and the land track 13 which is adjacent to either the inside or the outside of the land portion 15 in the radial direction of the disk, the position information of each ECC block which is provided by the embossed pits 16 is shared between the land track 13 and the groove track 14 located on the two side of the embossed pits 16.

Even if tracks are formed at a small track pitch to make the optical disk 10 have a higher recording density than an existing DVD-RAM, no record mark is present on the record area portion 23 of the land track 13 adjacent to the groove track 14 in which the embossed pits 21 are present and on the record area portion 24 of the groove track 14 adjacent to the groove track 14 in which the embossed pits 22 are present. Therefore, signals from the embossed pits 21 and 22 can be detected with sufficient SNRs without any influences of crosstalk. In addition, since no data to be reproduced are present in the record area portions 23 and 24 on the land track 13 and groove track 14 which are adjacent to the groove tracks 14 in which the embossed pits 21 and 22 are present, no consideration needs to be given to crosstalk from the embossed pits 21 and 22.

The record area portion 23 of the land track on both sides of which grooves are present differs in record characteristic and reproduction characteristic from the record area portion of the land track only on one side of which a groove is present. In such a case, it may be difficult to record/reproduction data on/from the record area portion 23. In the present invention, however, no recording/reproduction is performed on the record area portion 23, there is no need to consider such difficulty. Although not clearly shown in the drawing, all the remaining areas on the optical disk have the same arrangement as that described above.

Note that if the restrictions on crosstalk are relaxed more or less in accordance with the recording density (or track pitch) in the tracking direction, only the record/reproduction interruption portion 23 may be formed, and the record/reproduction interruption portion 24 may be used for recording/reproducing as in an ordinary case.

An optical disk apparatus for recording/reproducing data by driving the optical disk 10 having the above embossed pits will be described next with reference to FIG. 4.

Figure 4:
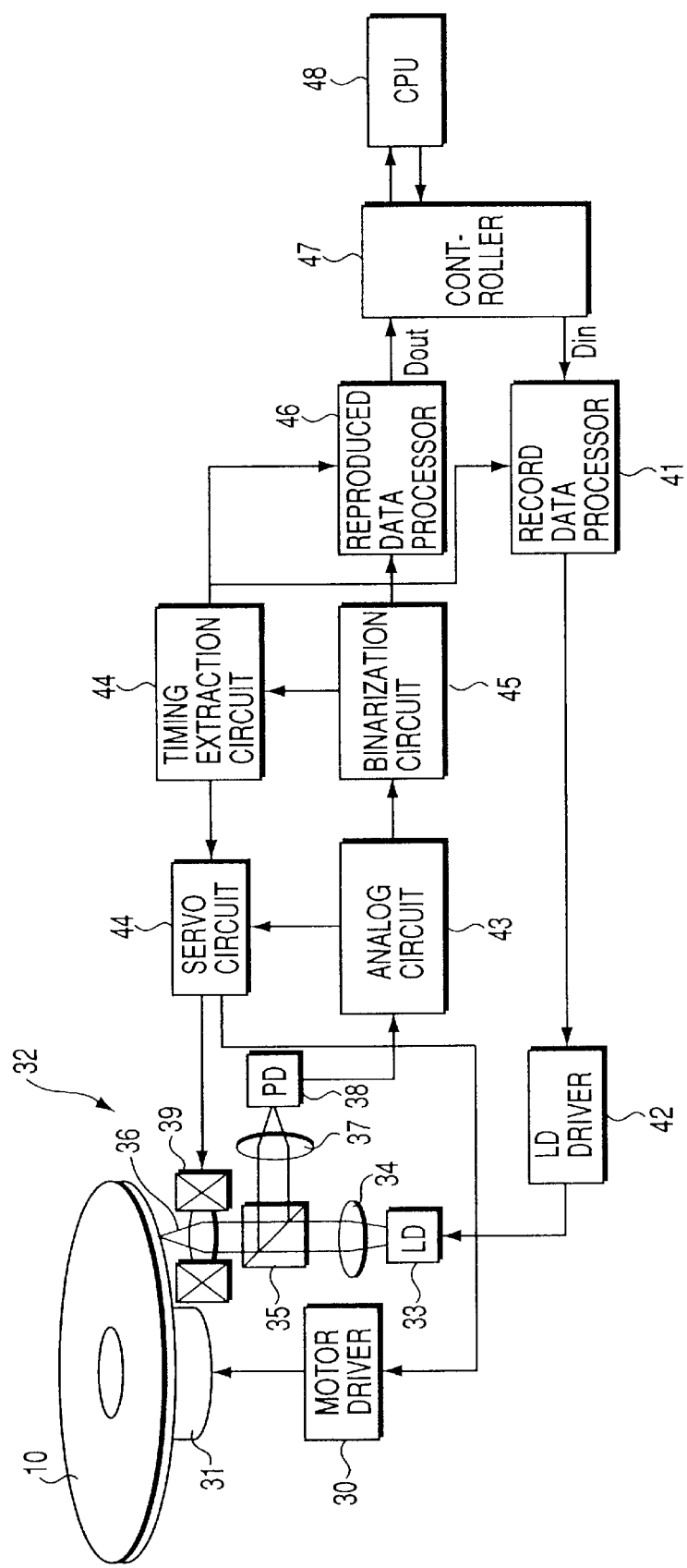
FIG. 4 is a block diagram showing the arrangement of an optical disk apparatus according to an embodiment of the present invention.

Referring to FIG. 4, the optical disk 10 is rotated by a spindle motor 31 driven by a motor driver 30. Data is recorded/reproduced on/from the optical disk 10 by an optical head 32. The optical head 32 is comprised of a laser diode (LD) 33 serving as a light source, a collimator lens 34 for collimating a light beam emitted by the laser diode 33, a beam splitter 35 for spitting incident light to the optical disk 10 and reflected light from the optical disk 10, an objective lens 36 for focusing a light beam having passed through the beam splitter 35 to apply the light beam as a minute spot to the optical disk 10, and a lens actuator 39 for moving a focusing lens 36, which is used to condense light reflected by the optical disk 10 and guided by the beam splitter 35, in the optical axis direction (focusing direction) and the tracking direction. The arrangement of the optical head 32 is not limited the one shown in FIG. 4.

A photo-detector 38 is a multi-segment split photo-detector whose detection area is divided into a plurality of areas, e.g., four areas. A plurality of output signals output from the photo-detector 38 are input to an analog circuit 43. The analog circuit 43 generates a reproduction signal corresponding to data recorded on the optical disk 10, focus and tracking error signals for focus servo control and tracking servo control, a speed control signal for controlling the rotational speed of the spindle motor 31. Focus servo control is performed to adjust the focus of the objective lens 36 to the record surface of the optical disk 10. Tracking servo control is performed to make a light beam applied onto the optical disk 10 follow a track.

The focus and tracking error signals are input to a servo circuit 40. The objective lens 36 is then controlled in the focusing and tracking directions by the lens actuator 39 under the control of the servo circuit 40. The servo circuit 40 also controls the motor driver 30 in accordance with a speed control signal generated on the basis of a periodic signal (to be described later) obtained from the optical disk 10.

Record operation will be briefly described next.

In record operation, data stream Din to be recorded is processed by a record data processor 41. The resultant data is input to an LD driver 42. The LD driver 42 modulates the light intensity of the laser diode 33 in accordance with the data stream Din. The intensity-modulated light beam is irradiated on the optical disk 10 through the collimator lens 34, the beam splitter 35, and the objective lens 36. With this operation, the data is recorded as a record mark, e.g., a phase change mark having undergone a phase change from a crystalline state to an amorphous state or from an amorphous state to a crystalline state, on the record film 12 of the optical disk 10.

In a record operation, light reflected by the optical disk 10 is incident on the photo-detector 38 through the objective lens 36, beam splitter 35, and focussing lens 37, and an output from the photo-detector 38 is input to the analog circuit 43, thereby generating a signal corresponding to the embossed pits 16 in the optical disk 10 (to be referred to as an embossed pit signal hereinafter) and a periodic signal whose amplitude changes in accordance with wobble patterns on land and groove tracks on the optical disk 10.

A timing extraction circuit 44 generates the position information of the ECC block indicated by the embossed pits 16 in accordance with the embossed pit signal, and also generates a speed control signal in accordance with the periodic signal. The speed control signal is input to the servo circuit 40. The servo circuit 40 controls the spindle motor 31 to a predetermined rotational speed through the motor driver 30 on the basis of the speed control signal. The position information of the ECC block is used by the record data processor 41 to generate an ECC block and sector address information.

The position information of the ECC block is input to a CPU 48 through a controller 47 to generate logical position information for separating the ECC block into two blocks and a record/reproduction interruption portion between the two blocks. In this case, the record/reproduction interruption portion is formed on a track, on the optical disk, adjacent to a track in which embossed pits are present, at a position that is adjacent to or opposes the land portion in which the embossed pits are formed (see FIG. 2). The controller 47 executes control to temporarily interrupt recording on the record/reproduction interruption portion during the record operation.

In this record operation, the analog circuit 43 further generates a focus error signal and tracking error signal. The lens actuator 39 is controlled by the servo circuit 40 on the basis of these signals, thereby performing focus servo control and tracking servo control.

Figure 5:
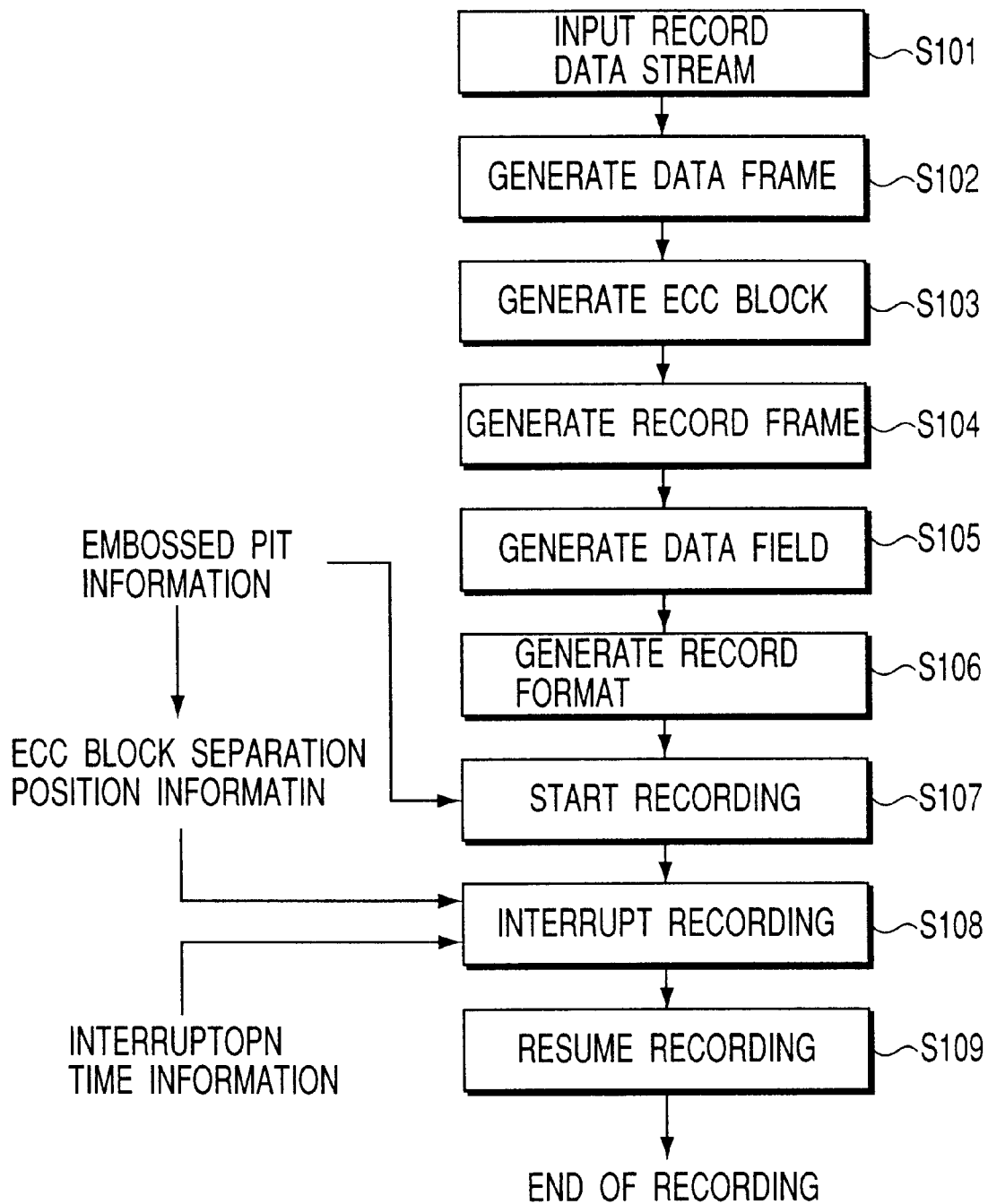
FIG. 5 is a flow chart showing a procedure for record processing in this embodiment.

A procedure for the record operation will be described with reference to FIG. 5.

Figure 6:
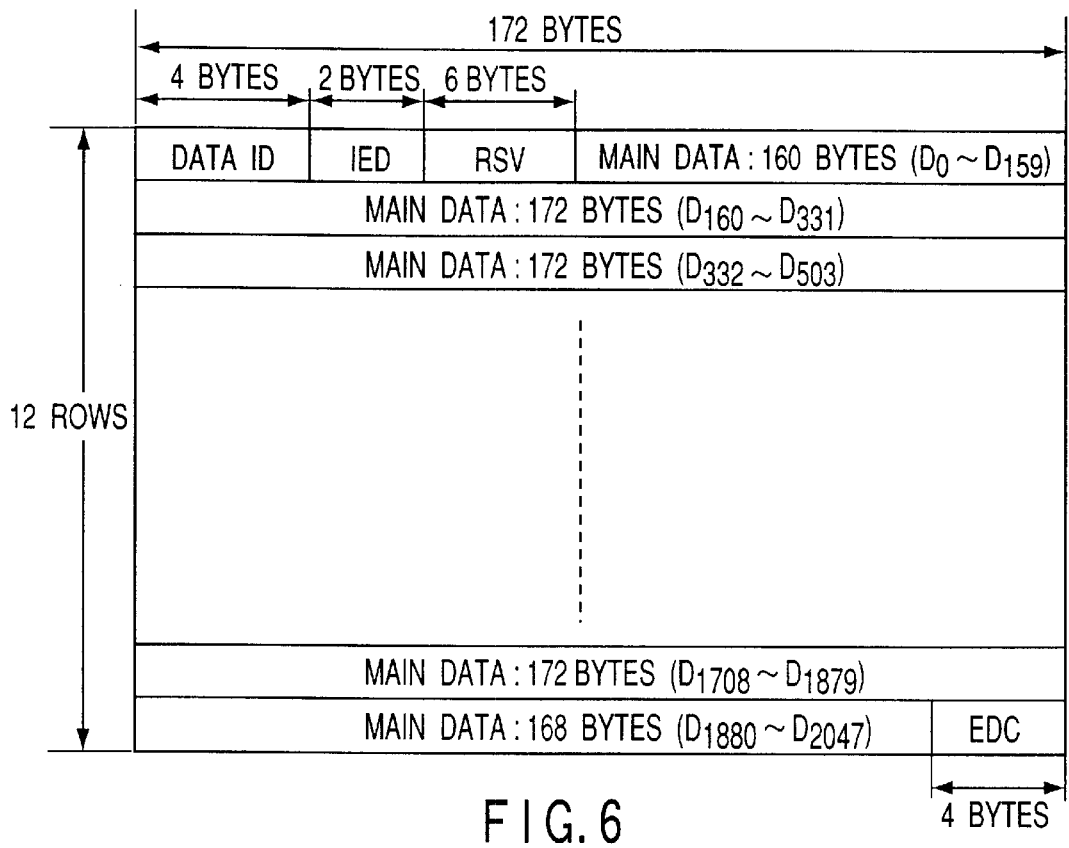
FIG. 6 is a view showing a data frame structure.
Figure 7:
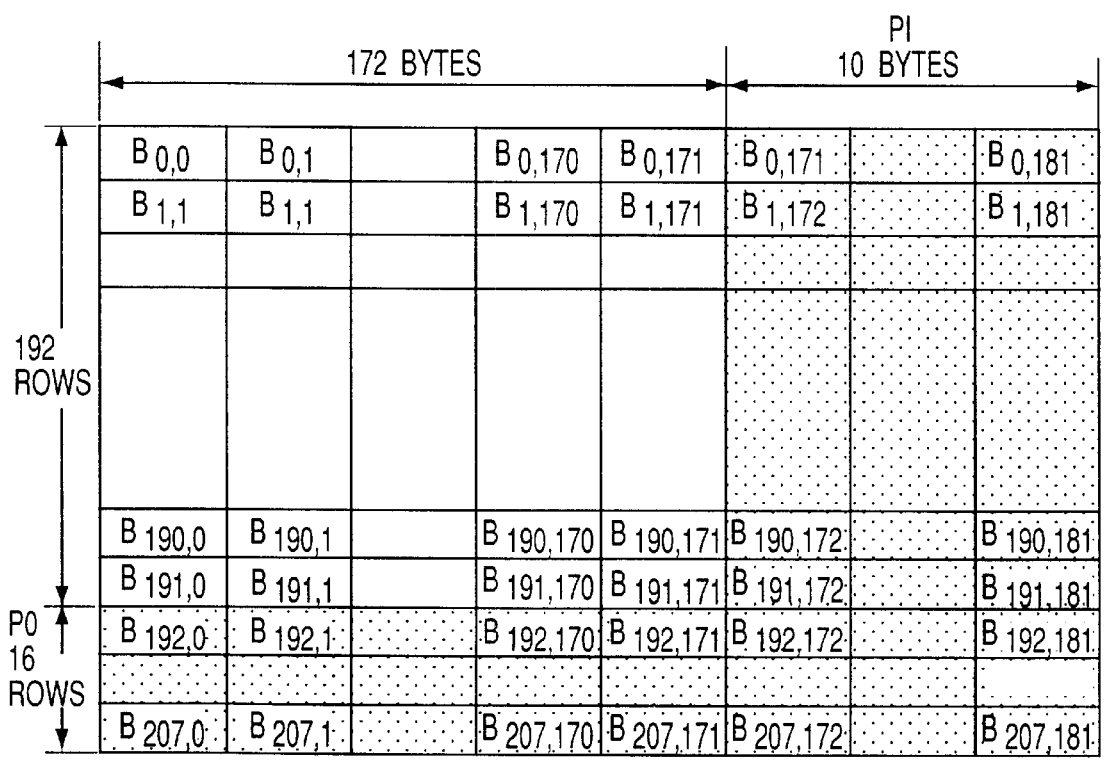
FIG. 7 is a view showing a logical structure of an ECC block.
Figure 8:
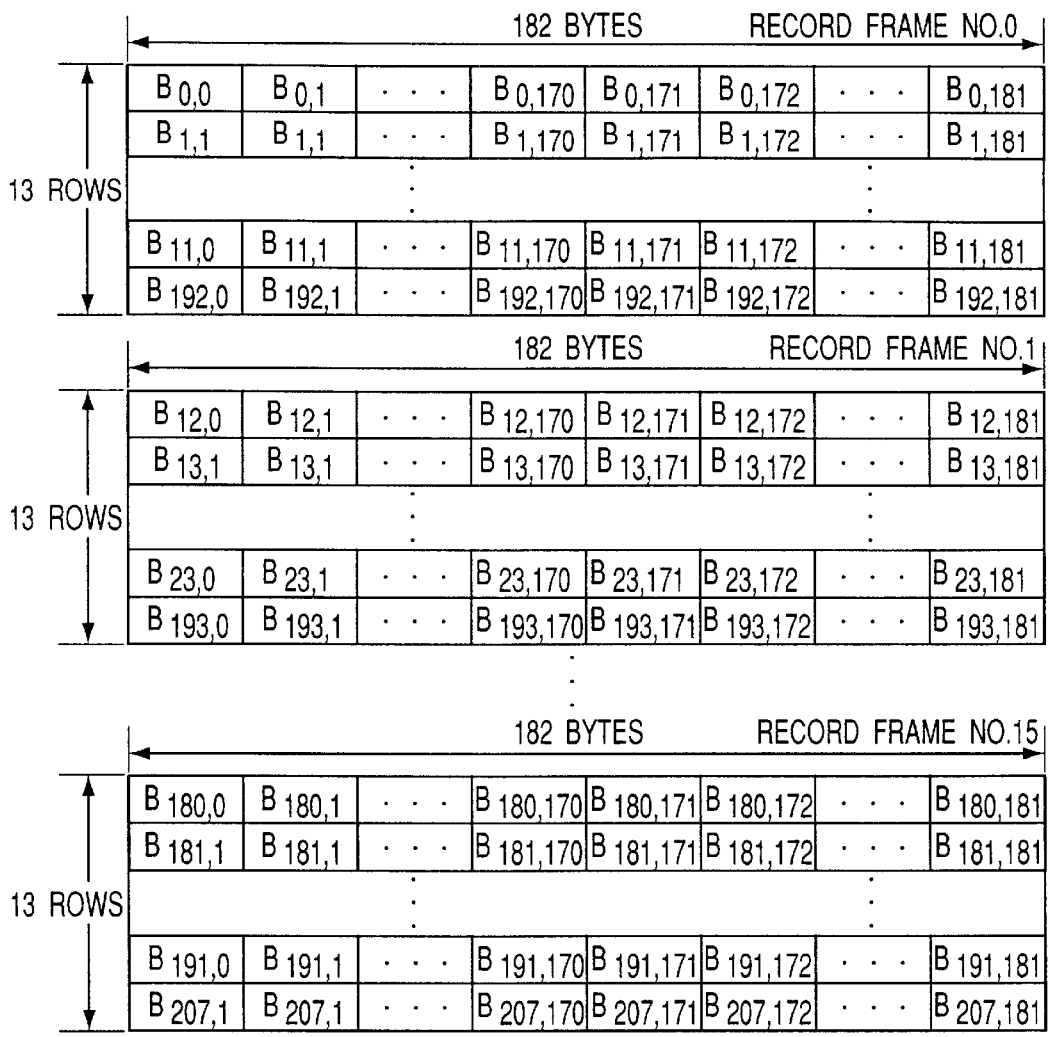
FIG. 8 is a view showing a record frame structure.

First of all, the data stream Din is input to the record data processor 41 through the controller 47 (step S101). A data frame like the one shown in FIG. 6 is generated from the input data stream Din. The data stream Din is divided into 2,048-byte data sectors first. Each data sector is then formed into a data frame of 172×12 bytes. As shown in FIG. 6, the data frame consists of 2,064 bytes with an array of 12 rows each having 172 bytes. The first row is constituted by 4-byte data identification data (data ID), a 2-byte ID error detection code (IED), 6-byte reserve byte data (RSV), and 160-byte main data $D_0$ to $D_{159}$. The main data are the elements of a data sector. The second to eleventh rows are respectively constituted by 172-byte main data $D_{160}$ to $D_{331}$, $D_{332}$ to $D_{503}$, . . . , $D_{1708}$ to $D_{1879}$. The 12th row, i.e., the last row, is constituted by 168-byte main data $D_{1880}$ to $D_{2047}$ and a 4-byte error detection code (EDC) for detecting an error caused in the data frame (step S102). Thereafter, scramble processing is performed, and error correction coding is performed for the resultant data frame (to be referred to as scrambled frame) to generate an ECC block like the one shown in FIG. 7. In the ECC block, 192 scrambled frames as 192 rows each having 172 bytes are stacked on each other, and a 16-byte outer code parity PO is added to each of the 172 columns, thus amounting to 208 rows. By adding a 10-byte inner code parity PI to each row, an ECC block is constituted by 208 rows each having 182 bytes (step S103). Furthermore, 16 record frames like those shown in FIG. 8 are generated from the ECC block by interleaving (step S104).

Figure 9:
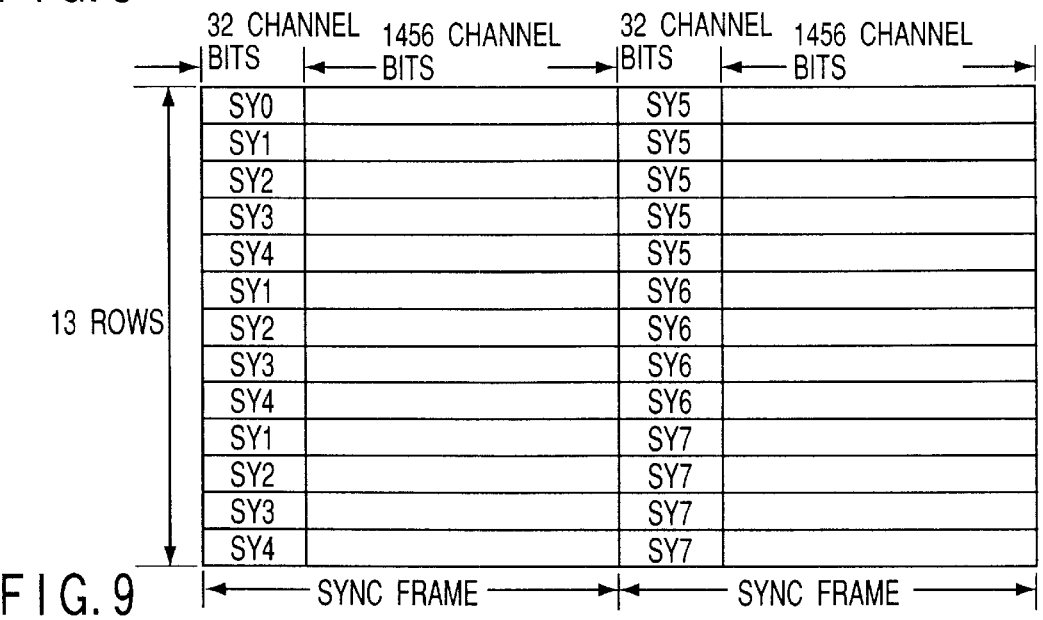
FIG. 9 is a view showing a data field structure.

The record frames are then modulated/coded by 8/16 modulation. Data fields to be recorded on the optical disk 10 are generated from the resultant record frames. When the data recorded on the optical disk 10 is to be reproduced, if the boundaries between the record frames cannot be determined, the original data cannot be reconstructed. For this reason, as shown in FIG. 9, a 32-bit sync pattern is added to the head of 1,456 channel bits of each record frame having undergone modulation processing to generate a 1,488-bit sync frame, thereby forming a data field. This data field is constituted by 13 rows each serving as a sync frame. The 1,456 channel bits of each sync frame represent 91 first 8-bit-byte data and 91 second 8-bit data of each row of each record frame. Each row of a data field represents each row of a record frame. As a sync pattern, a pattern which can be easily detected from a data stream and is not mistakenly detected is preferably selected. Referring to FIG. 9, eight types of pattern SY0 to SY7 are prepared as sync pattern streams used as sync patterns. One sync pattern is selected from these sync pattern streams SY0 to SY7 in accordance with the position of a record frame in a data field having undergone modulation processing (step S105). A record format for an ECC block is generated from this data field (step S106). The LD driver 42 intensity-modulates a light beam emitted from the laser diode 33 in accordance with the generated record format to start recording data on the optical disk 10 (step S107).

Position information for separating the ECC block is generated from the embossed pit information of the ECC block to be recorded, and record operation is temporarily interrupted in accordance with this information. A position (to be described later) at which the ECC block is separated is set immediately before or after sector address information or immediately before the sync pattern streams SY0 to SY7 in a data area to facilitate reproduction. The interruption time is determined in advance from the length of embossed pits, the rotational speed of the disk, and a margin area in record operation. This can inhibit data from being recorded on an area, on a track adjacent to a track in which embossed pits are present, which is adjacent to or opposes the land portion in which the embossed pits are formed (step S108).

Finally, recording is resumed. The record operation can be resumed because of a Gap field as a field for ensuring the standby time during which the output level of a light beam from the laser diode 33 as a light source in this embodiment rises to a predetermined power and a Guard field for shifting the position of a phase change mark (step S109), as will be described later.

Figure 10:
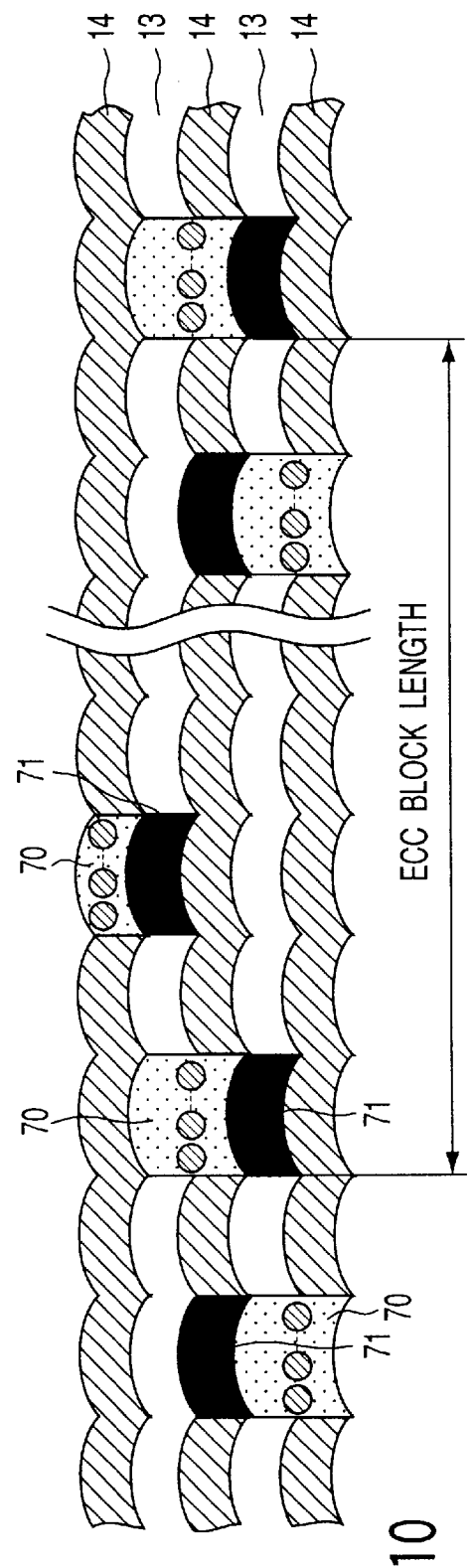
FIG. 10 is a plan view showing record/reproduction interruption portions and record areas on tracks on the optical disk according to this embodiment.

With the above record operation, recording on a record area on the optical disk 10 in FIG. 10 can be performed. Referring to FIG. 10, areas 70 are embossed pit areas on which no data is recorded. Areas 71 of the land tracks 13 and groove tracks 14 are areas on which recording is interrupted, and data is recorded on the remaining areas.

Reproduction operation will be described next.

In the reproduction operation, as shown in FIG. 4, a light beam having a predetermined intensity and emitted by the laser diode 33 is irradiated on the optical disk 10 through the collimator lens 34, beam splitter 35, and objective lens 36. Reflected light from the optical disk 10 is incident on the photo-detector 38 through the objective lens 36, beam splitter 35, and focussing lens 37. An output from the photo-detector 38 is input to the analog circuit 43, from which changes in reflectance due to the presence/absence of record marks on the record film 12 are output as a reproduction signal.

In this reproduction operation as well, the analog circuit 43 generates a periodic signal corresponding to wobble patterns on the optical disk 10 and focus and tracking error signals. The timing extraction circuit 44 generates a speed control signal in accordance with the periodic signal. The spindle motor 31 is controlled to a predetermined rotational speed by the servo circuit 40 through the motor driver 30 on the basis of this speed control signal. The lens actuator 39 is also controlled by the servo circuit 40 on the basis of the focus and tracking error signals, thereby performing focus servo control and tracking servo control.

The reproduction signal corresponding to the record marks and output from the analog circuit 43 is converted into binary data by a binarization circuit 45. The binary data is input to the timing extraction circuit 44. The timing extraction circuit 44 detects a sync pattern in the reproduction signal from the binary data. More specifically, the timing extraction circuit 44 detects the position of a sync pattern and the pattern. Since the reproduction signal includes a bit error caused by a medium defect in the optical disk 10 or the influence of noise, the timing extraction circuit 44 may not detect a sync pattern at a proper position or erroneously detect a sync pattern at a wrong position. The timing extraction circuit 44 has the function of properly detecting the position of a sync pattern in consideration of these influences. In addition, the timing extraction circuit 44 determines the boundaries between demodulated symbols, record blocks, and recorded sector after modulation by using both a sync pattern detection position signal and a sync pattern detection signal indicating that the sync pattern is a specific one of the pattern streams SY0 to SY7 (to be described later). An output from the binarization circuit 45 is input to a reproduction data processor 46. The reproduction data processor 46 outputs a reproduction data stream Dout by performing processing for the binary signal from the binarization circuit 45 which is almost reverse to that performed by the record data processor 41.

A procedure for reproduction operation will be described below.

First of all, the optical head 32 seeks a sector on which desired record data is recorded. A read analog signal from the optical head 32 is input to the binarization circuit 45 to be converted into binary data. This binary data is demodulated by 16/8 modulation to become reproduction data. Addresses are present in units of sectors. This address information is read out first.

The beginning of an address area is a VFO area, which will be described in detail later in the following description of a format. The VFO area is used to generate a generate a sync signal of the phase locked loop of read channel bits corresponding to the read channel bits, thereby allowing address information to be read out after a sync signal is obtained. The position of an ECC block in which the corresponding address is present is discriminated in accordance with the read address information. Reproduction processing is performed by obtaining the position information of the area on which recording has been interrupted as described above from this position information. That is, reproduction information on the area 71 which is present between the two divided blocks obtained by dividing the ECC block and in which no record data is present is neglected. Data following the area 71 includes a Gap field and a Guard field, and VFO is then obtained. Therefore, a sync signal used to read out subsequent address information and data can be stably obtained. In this manner, reproduction data corresponding to the desired address can be read out and recorded on the memory. When the reproduction data on the 16 record frames constituting one ECC block are written in the memory, error correction is performed. At this time, descrambling is performed to restore the data, which were scrambled when record data were generated, to the original data, thereby outputting the reproduction data stream Dout.

By performing the above record and reproduction operations, data can be recorded/reproduced on/from areas on the optical disk 10 in FIG. 10, thus solving the problem that arise in record/reproduction operation when crosstalk occurs and embossed pits are present in an adjacent track.

The record format of an ECC block will be described next.

Figure 11:
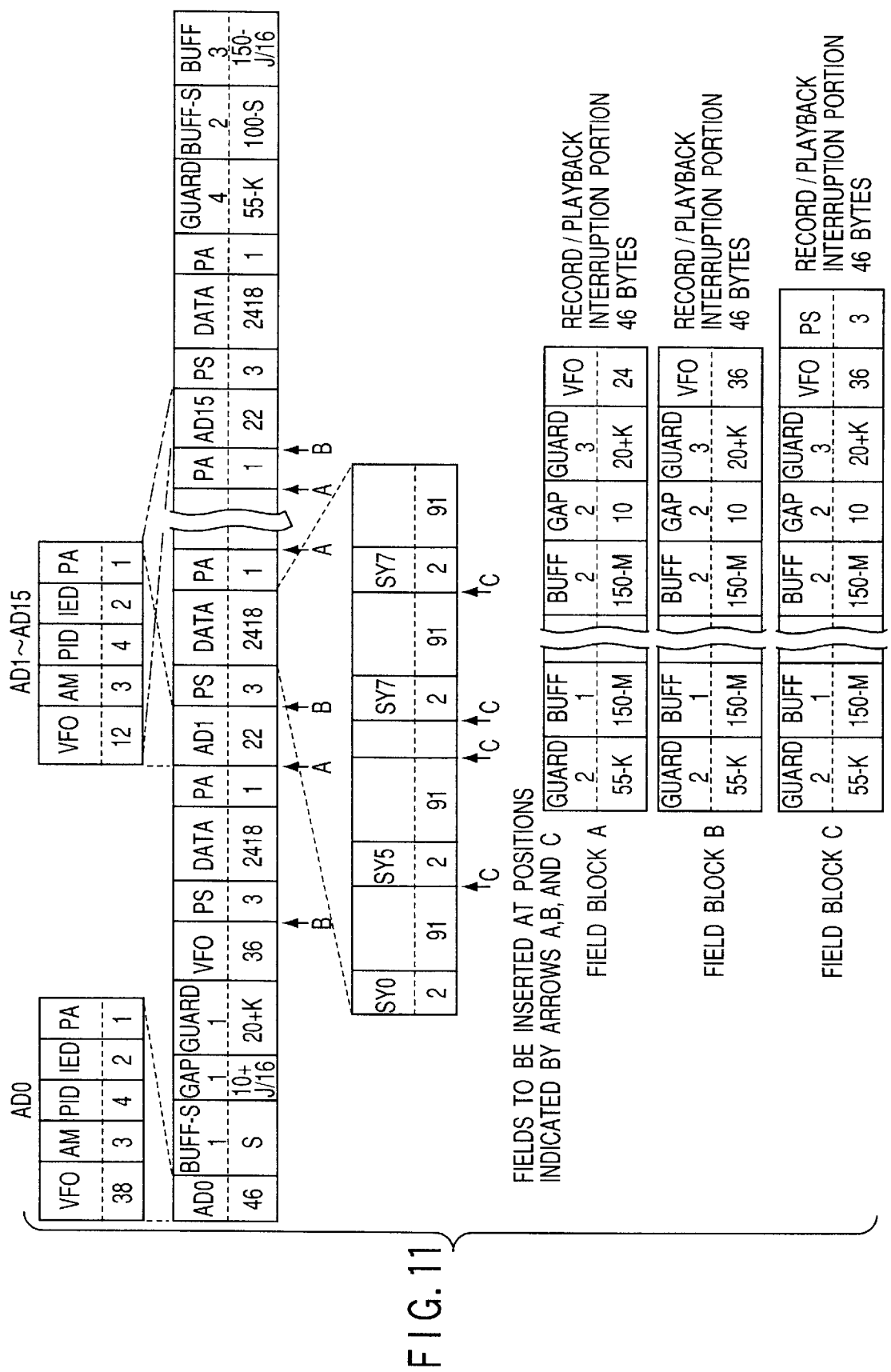
FIG. 11 is a view showing the record format of an ECC block on the optical disk according to this embodiment.

FIG. 11 shows the record format of an ECC block on the optical disk 10 in this embodiment. Referring to FIG. 11, the contents of each field of an ECC block are represented by the letters in the upper row, and the byte length is represented by the numeral in the lower row. As shown in FIG. 11, address fields AD0 to AD15 are set at the beginnings of the respective sectors constituting the ECC block. The sector address fields AD0 to AD15 are areas for providing address information of the respective sectors constituting the ECC block. Each sector address field is made up of a VFO field, AM field, PID field, IED field, and PA field. In this case, the first sector address field AD0, i.e., the first sector address information, also serves as address information made of embossed pits in units of ECC blocks, as described with reference to FIGS. 1 and 2.

In data record operation, a Buffer-S 1 field, GaP 1 field, and Guard 1 field are set after the first sector address field AD0. Subsequent to the Guard 1 field, a VFO field, PS field, DATA field of the first sector, and PA field are sequentially recorded as phase change marks. A PS field, DATA field of the second sector, and PA field are sequentially recorded as phase change marks following a second sector address field AD1 consisting of a VFO field, AM field, PID field, IED field, and PA field.

Likewise, a sector address field and (n=1, 2, . . . , 15) and a subsequent PS field, DATA field, and PA field are repeatedly recorded as phase change marks n=15 times.

A Guard 4 field, Buffer-S 2 field, and Buffer 3 field are formed after a 16th sector address field AD15 and a subsequent PS field, DATA field of the 16th sector, and PA field, thereby completing one ECC block.

In this case, a position at which recording is interrupted is indicated by one of the arrows in FIG. 11, and calculated from the information of AD0. Field blocks A, B, and C, each having a Guard 2 field, Buffer 1 field, record/reproduction interruption portion, Buffer 2 field, Gap 2 field, Guard 3 field, VFO field, and PS field, are inserted at the positions corresponding to the letters A, B, and C at the arrows. The positions at which the field blocks are inserted correspond to a position (A) immediately before sector address information, a position (B) immediately after sector address information, and a position (C) immediately before a sync pattern in a data area. Note that a byte count S of a Buffer S1 field is determined such that a land portion which is present on an adjacent track and in which embossed pits are formed is adjacent to a record/reproduction interruption portion.

The contents of each field will be described below.

[VFO Field]

A VFO field is a field for generating a sync signal of the phase locked loop of read channel bits corresponding to the read channel bits. The VFO field in the ECC block address field (first sector address field) AD0 and the VFO field following the buffer S1 field, Gap field and the Guard 1 field after AD0 each have a length of 36 bytes. Each of the VFO fields in the second to 16th sector address fields has a length of 12 bytes. The VFO fields following the Guard 3 fields vary in byte length depending on the record/reproduction interruption positions, and each have a length of 24 or 36 bytes.

[AM (Address Mark) Field]

An address mark is a field for providing byte synchronization for the optical apparatus for the next PID field, and made of a mark pattern that cannot be generated by 8/16 modulation. This field has a length of 3 bytes.

[PID (Physical Identification Data) Field]

A PID field is 4-byte data constituted by a reserve area, PID number, selector type, layer number, and sector number.

[IED (ID Error Detection Code) Field]

This field is an IED field for detecting an error caused in a data ID, and consists of 2-byte data.

[PA (Postamble) field]

This field is data for completing 8/16 modulation of the last byte of the preceding field (IED field or data field), and has a length of 1 byte (16 channel bits).

[Gap 1 Field/Gap 2 Field]

This field is used to ensure the standby time required for the output of a light beam from the laser diode 33 as a light source to rise to a predetermined power, and has a length of 10+J/16 bytes, i.e., (160+J) channel bits. The number J randomly changes between $0 \leq J \leq 15$. However, for the Gap 2 field, J=0. Assume that variations in the length of the Gap 1 field are compensated by the length of the Buffer 3 field.

[Guard 1 field/Guard 3 field]

This field is set after a Gap field, and has a length of (20+K) bytes. In the field, a predetermined 16-channel-bit pattern is repeated (20+K) times. The number K is randomly changed between "0" and "7" to shift the positions of the phase change marks formed in fields ranging from the VFO field following the Guard 1 (Guard 3) field to the Guard 2 (Guard 4) field. The first 20 bytes of the Guard 1 (Guard 3) field are used to protect the beginning of the subsequent VFO field against a signal deterioration upon execution of many overwrites. The contents of this field are neglected in data read operation.

[Pre-Sync Code (PS) Field]

This field is data for establishing byte synchronization for the next data field and consists of a unique channel bit pattern having a length of 3 bytes (48 channel bits).

[DATA (Data) Field]

This field is an area on which the data of the above data field is recorded as a phase change mark, and has a length of 2,418 bytes.

[Guard 2 Field/Guard 4 Field]

This field is set before the Buffer 1 field/Buffer 2 field and has a length of (55−K) bytes. In this field, a 16-channel-bit pattern like the one in the Guard 1 field/Guard 3 field is repeated (55−K) times. The total length of the Guard 1 (Guard 3) field and Guard 2 (Guard 4) field is 75 bytes regardless of the number K. The last 20 bytes of the Guard 2 (Guard 4) field are used to protect the end of the DATA field against a signal deterioration upon execution of many overwrites. The remaining (55−K−20) bytes are used to absorb variations in the actual length of data written in the optical disk 10. The contents of this field are neglected in data read operation.

[Buffer 1 Field/Buffer 2 Field]

These fields are set immediately before and after a record/reproduction interruption portion to absorb changes in actual sector length which are caused by variations in the rotational speed of the optical disk 10 in a data write in an area ranging from the beginning of the ECC block to the start position of the record/reproduction interruption portion, decentering, and the like, and variations in the physical position of the record/reproduction interruption portion due to random shifts of the record position in phase change record operation. In this case, each buffer field has a length of (150−M) bytes. The number M is determined by the position of the record/reproduction interruption portion ($10 \leq M \leq 140$).

[Buffer 3 Field]

This field is set at the end of the ECC block and serves as an area for absorbing changes in actual sector length which are caused by variations in the rotational speed of the optical disk 10 in a data write in an area ranging from the beginning of the ECC block to the end of the ECC block, decentering, and the like, random shifts of the record position in phase change record operation, and deterioration at the beginning and end of data. In this case, this field has a length of (150−J/16) bytes.

[Buffer-S1 Field]

The Buffer-S1 field is set after the first sector address field AD0 and has a length of S bytes. The number S ($0 \leq S \leq 100$) is determined on the basis of the information of the first sector address field AD0 such that an embossed pit area which is present on an adjacent track is accurately located adjacent to the record/reproduction interruption portion in the field.

[Buffer-S 2 Field]

The Buffer-S 2 field is set immediately before the Buffer 3 field and always has a constant length of 100 bytes regardless of whether the sum of the lengths of the Buffer-S 1 field and Buffer S2 field is equal to the number S.

[Record/Reproduction Interruption Portion]

A record/reproduction interruption portion has a length equal to or larger than the embossed pit length. No data is recorded on this portion. In this case, the portion has the same length as the embossed pit length, i.e., 46 bytes.

In an existing DVD-RAM, Buffer and Guard fields are set in units of sectors. In this embodiment, two each of these fields are set in units of ECC blocks. With this arrangement, the format efficiency in this embodiment can be increased by decreases in buffer and guard areas as compared with the existing DVD-RAM.

The format efficiency increasing effect of the present invention will be described in detail below with reference to numerical data.

The existing DVD-RAM has a sector format. One sector is constituted by a 128-byte header field Header (H1 to H4), 1-byte mirror field Mirror, (10+J/16)-byte Gap field, (20+K)-byte Guard 1 field, 35-byte VFO field, 3-byte PS field, 2,418-byte DATA field, 1-byte PA field, (55−K)-byte Guard 2 field, and (25−J/16)-byte Buffer field. The sector length is 2,697 bytes. Each ECC block is made up of 16 sectors, and hence the ECC block length is 2,697×16=43,152 bytes.

Figure 12:
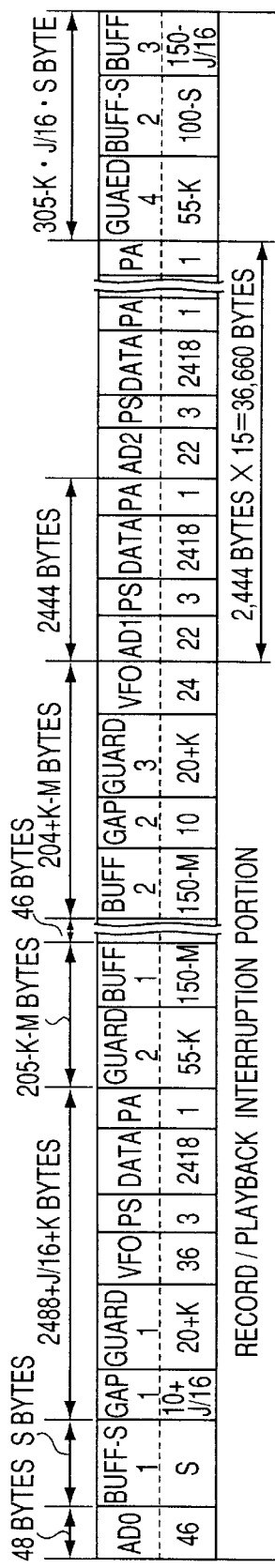
FIG. 12 is a view showing the record format of an ECC block on the optical disk according to this embodiment.
Figure 13:
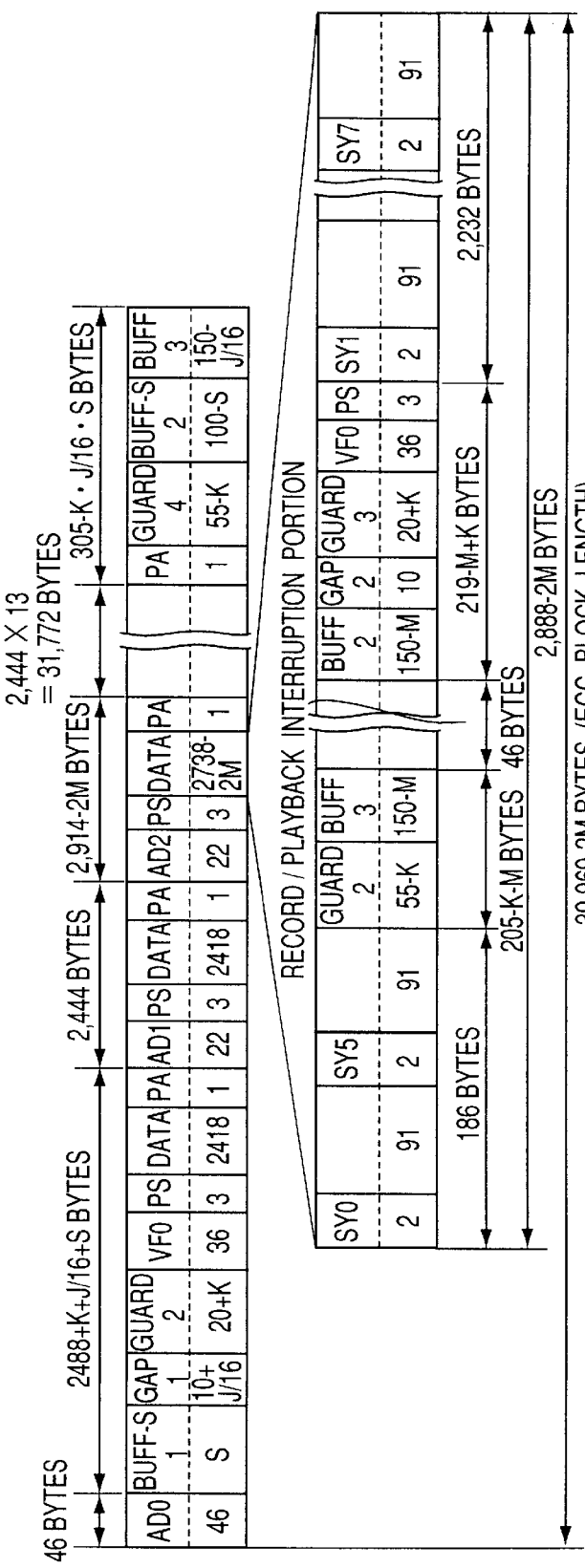
FIG. 13 is a view showing another record format of an ECC block on the optical disk according to this embodiment.

This embodiment uses the formats shown in FIGS. 12 and 13. FIG. 12 shows a case in which a record/reproduction interruption portion is present immediately before sector address information. FIG. 13 shows a case in which a record/reproduction interruption portion is present in a data area. As is obvious from FIGS. 12 and 13, the ECC block length becomes a maximum length in a case (M=10) in which a record/reproduction interruption portion is present in a data area, and a Buffer 1 field and Buffer 2 field have the maximum lengths.

In this case, each ECC block is comprised of (2,488+K+J/16+S)-byte first sector data consisting of a 46-byte ECC block address AD0, S-byte Buffer-S 1 field, (10+J/16)-byte Gap field, (20+K)-byte Guard 1 field, 36-byte VFO field, 3-byte PS field, 2,418-byte DATA field, and 1-byte PA field, second sector data and fourth to 15th sector data having a total length of 34,216 bytes and having a length of 2,444 bytes each and a 22-byte sector address ADn (n=1, 2, 4, . . . , 15) field, 2,418-byte DATA field, 1-byte PA field, 3-byte PS field, 2,418-byte DATA field, and 1-byte PA field, (2,914−2M)-byte third sector data including a record/reproduction interruption portion, (55−K)-byte Guard 4 field, (100−S)-byte Buffer-S 2 field, and (150−J/16)-byte Buffer 2 field. The ECC block length is 39,969−2M bytes. According to (M=10), the maximum ECC block length is 39,949 bytes.

According to this embodiment, therefore, the ECC block length is 93% (=39,9494/43,152 bytes) of that in the existing DVD-RAM. That is, the capacity required to record the same data becomes 93% of that of the existing DVD-RAM, and hence the format efficiency is expected to increase by 7%.

In the above case, when embossed pits are present in a track adjacent to both a land track and a groove track, recording is interrupted. As described above, the present invention is applied to only recording of data on land tracks if the amount of crosstalk at an embossed pit portion on a land track is smaller than that on a groove track, and crosstalk at the groove track is too small to pose a problem in this scheme. In this case, since the record areas on groove tracks increase, the format efficiency can be further increased by using different record formats for land and groove tracks.

In this embodiment, the Buffer-S1 field and Buffer-S 2 field are set at the beginning and end of the record format.

However, the Buffer-S field and Buffer-S 2 field can be omitted by increasing the record/reproduction interruption portion by the sum of the numbers of bytes of the Buffer-S field and Buffer-S 2 field.

In this embodiment, the rotation control scheme has been described on the premise that a CLV (Constant Linear Velocity) scheme is used. However, this embodiment can be applied to a ZCLV scheme and ZCAV (zoned Constant Angular Velocity) scheme as other rotation control schemes. In the ZCLV and ZCAV schemes, since the rotational speed remains the same in a zone, the positions of embossed pits within the zone are the same as those in the format. Hence, a record/reproduction interruption portion is fixed at a predetermined position in the format. In this case, the value of S of the Buffer-S 1 field and Buffer-S 2 field and the value of M of the Buffer 1 field and Buffer 2 field remain constant in the zone.

As described above, according to this embodiment, the position information of each ECC block is recorded in advance as embossed pits on an optical disk. When data of each sector and the address information of each sector of an ECC block are recorded on the basis of this position information, logical position information for separating the ECC block into two blocks and a record/reproduction interruption portion between the two separated blocks are generated from the position information of the ECC block. Then, the format efficiency is increased by temporarily interrupting recording in each record/reproduction interruption portion. In addition, since no record marks are present in an area, on an adjacent track, in which embossed pits are present, crosstalk from the embossed pits in the adjacent track can be eliminated during reproduction of record data, and crosstalk from the record data on the adjacent track during reproduction of the embossed pit.

There will be hereinafter described an embodiment wherein record marks are formed on an area approximate to the area containing embossed bits.

As shown in FIG. 2, groove portions required to obtain tracking error signals for tracking control required for record/reproduction of data on/from land tracks are present only on one side of land track areas 18 in the radial direction of the disk, which are adjacent to the opposite side to the side on which the embossed pits 16 are formed in the radial direction of the disk, and land portions 17 as groove track separation portions are present on the other side. For this reason, a correct tracking error signal cannot be obtained by the general tracking error detection method of using the phenomenon in which diffracted light components from track end portions on the two sides of a track on an optical disk become out of balance. It may therefore become difficult to perform stable tracking control.

In addition, on this land track area 18, a groove track separation portion looks spread due to the land portion 17, and hence the shape of a record mark distorts with the intensity of a general record light beam, and the mark center deviates from the center of the land track. As a result, the intensity of reflected light in reproduction operation differs from that from the general land track 13 having the groove tracks on the two sides in reproduction operation. It may therefore become difficult to stably perform data record/reproduction operation.

An optical disk apparatus according to another embodiment of the present invention which has been made in consideration of the above problem will be described below. According to this embodiment, while a light beam is positioned in a land track partial region 18, a tracking control system for positioning a light beam on a track is controlled to fix the position of the light beam in the radial direction of the disk to a predetermined position, and operation state switching control is performed on at least one of recording and reproduction systems for recording and reproducing data by impinging an optical disk with a light beam, thereby properly recording/reproducing data on the land track partial region 18.

This operation will be described in detail with reference to FIG. 14. An optical disk 10 has the same arrangement as that shown in FIGS. 1 and 2 and is rotated by a spindle motor 121 driven by a motor driver 122. Data is recorded/reproduced on/from this optical disk by an optical head mounted to oppose the optical disk 10.

The optical head is comprised of a laser diode (LD) 125 as a light source, a collimator lens 140 for collimating a light beam emitted by the laser diode 125, a beam splitter 128 for splitting incident light to the optical disk 10 and reflected light from the optical disk 10, an objective lens 120 for focusing a light beam having passed through the beam splitter 128 to apply the light beam as a small light beam spot to the optical disk 10, a focussing lens 141 for condensing the reflected light guided by the beam splitter 128, a photo-detector 126 for detecting the condensed reflected light, and a lens actuator 127 for moving the objective lens 120 in the optical axis direction (focusing direction) and the tracking direction.

The photo-detector 126 is a multi-segment split photo-detector whose detection area is divided into a plurality of areas, e.g., four areas. A plurality of output signals output from the photo-detector 126 are input to an analog arithmetic circuit 133. The analog arithmetic circuit 133 generates a reproduction signal corresponding to data recorded on the optical disk 10, focus and tracking error signals for focus servo control and tracking servo control, a speed control signal for rotational speed control on the spindle motor 121. Focus servo control is performed to adjust the focus of the objective lens 120 to the record surface of the optical disk 10. Tracking servo control is performed to make a light beam applied onto the optical disk 10 follow a track.

The focus and tracking error signals are input to a servo circuit 132. The objective lens 120 is then controlled in the focusing and tracking directions by the lens actuator 127 under the control of the servo circuit 132. The servo circuit 132 also controls the motor driver 122 in accordance with a speed control signal generated on the basis of a wobble signal (to be described later) obtained from the optical disk 10.

Record and reproduction operations will be briefly described next.

In the record operation, data stream Din to be recorded is processed by a record data processor 123. The resultant data is input to an LD driver 124. The LD driver 124 modulates the intensity of the laser diode 125. The intensity-modulated light beam is applied onto the optical disk 10 through the collimator lens, beam splitter 128, and objective lens 120. With this operation, the data is recorded as a record mark, e.g., a phase change mark having undergone a phase change from a crystalline state to an amorphous state or from an amorphous state to a crystalline state, on a record film 12 of the optical disk 10.

In the record operation, light reflected by the optical disk 10 is incident on the photo-detector 126 through the objective lens 120, beam splitter 128, and focussing lens 141, and an output from the photo-detector 126 is input to the analog arithmetic circuit 133, thereby generating a signal corresponding to embossed pits 16 in the optical disk 10 (to be referred to as an embossed pit signal hereinafter) and a wobble signal whose amplitude changes in accordance with wobble patterns on land tracks 13 and groove tracks 14 on the optical disk 10. A timing extraction circuit (not shown) generates the position information of the ECC block indicated by the embossed pits 16 in accordance with the embossed pit signal, and also generates a speed control signal in accordance with the wobble signal. The position information of the ECC block is used by a record data processor 130 to generate an ECC block and sector address information. The speed control signal is input to the servo circuit 132. The servo circuit 132 controls the spindle motor 121 to a predetermined rotational speed through the motor driver 122 on the basis of the speed control signal.

In this record operation, the analog arithmetic circuit 133 further generates a focus error signal and tracking error signal. The lens actuator 127 is controlled by the servo circuit 130 on the basis of these signals, thereby performing focus servo control and tracking servo control.

In the reproduction operation, a light beam having a predetermined intensity and emitted by the laser diode 125 strikes the optical disk 10 through the collimator lens 140, beam splitter 128, and objective lens 120. Light reflected by the optical disk 10 is incident on the photo-detector 126 through the objective lens 120, beam splitter 128, and focussing lens 141. An output from the photo-detector 126 is input to the analog arithmetic circuit 133, from which changes in reflectance due to the presence/absence of record marks on the record film 12 are output as a reproduction signal.

In this reproduction operation as well, the analog arithmetic circuit 133 generates a wobble signal corresponding to wobble patterns on the optical disk 10 and focus and tracking error signals. The timing extraction circuit (not shown) generates a speed control signal in accordance with the wobble signal. The spindle motor 121 is controlled to a predetermined rotational speed by the servo circuit 132 through the motor driver 122 on the basis of this speed control signal. The lens actuator 127 is also controlled by the servo circuit 132 on the basis of the focus and tracking error signals, thereby performing focus servo control and tracking servo control.

The reproduction signal corresponding to the record marks and output from the analog arithmetic circuit 133 is converted into binary data by a binarization circuit 129. The binary data is input to a reproduction data processor 136. The reproduction data processor 136 outputs a reproduction data stream Dout by performing processing for the binary signal from the binarization circuit 129 which is almost reverse to that performed by the record data processor 130.

A memory 131 and the controller 134 in FIG. 14 will be described next. While a light beam is positioned in the land track partial region 18, a tracking control system for positioning a light beam on a track is controlled to fix the position of the light beam in the radial direction of the disk to a predetermined position, and operation state switching control is performed on a recording system or reproduction system for recording or reproducing data by irradiating an optical disk with a light beam, thereby properly recording/reproducing data on the land track partial region 18. The position information of the land track partial region 18 (referring to FIG. 15) required for this switching control is stored in the memory 131 in advance.

Since land portions 17 as groove track separation portions are formed in units of ECC blocks, the position of the land portion 17 is predicted on the basis of a signal from the immediately preceding embossed pits 16, and stable record/reproduction operation can be performed by changing the intensity and position of a light beam, the characteristics of the analog arithmetic circuit 133, and the like. In contrast to this, the land track partial region 18 of one of the land tracks 13 which is adjacent to the land portion 17 as a groove track separation portion and does not share the embossed pits 16 is placed midway in a general data area. For this reason, to predict the position of this area 18, the layout information of the embossed pits 16 is required in advance.

Figure 15A:
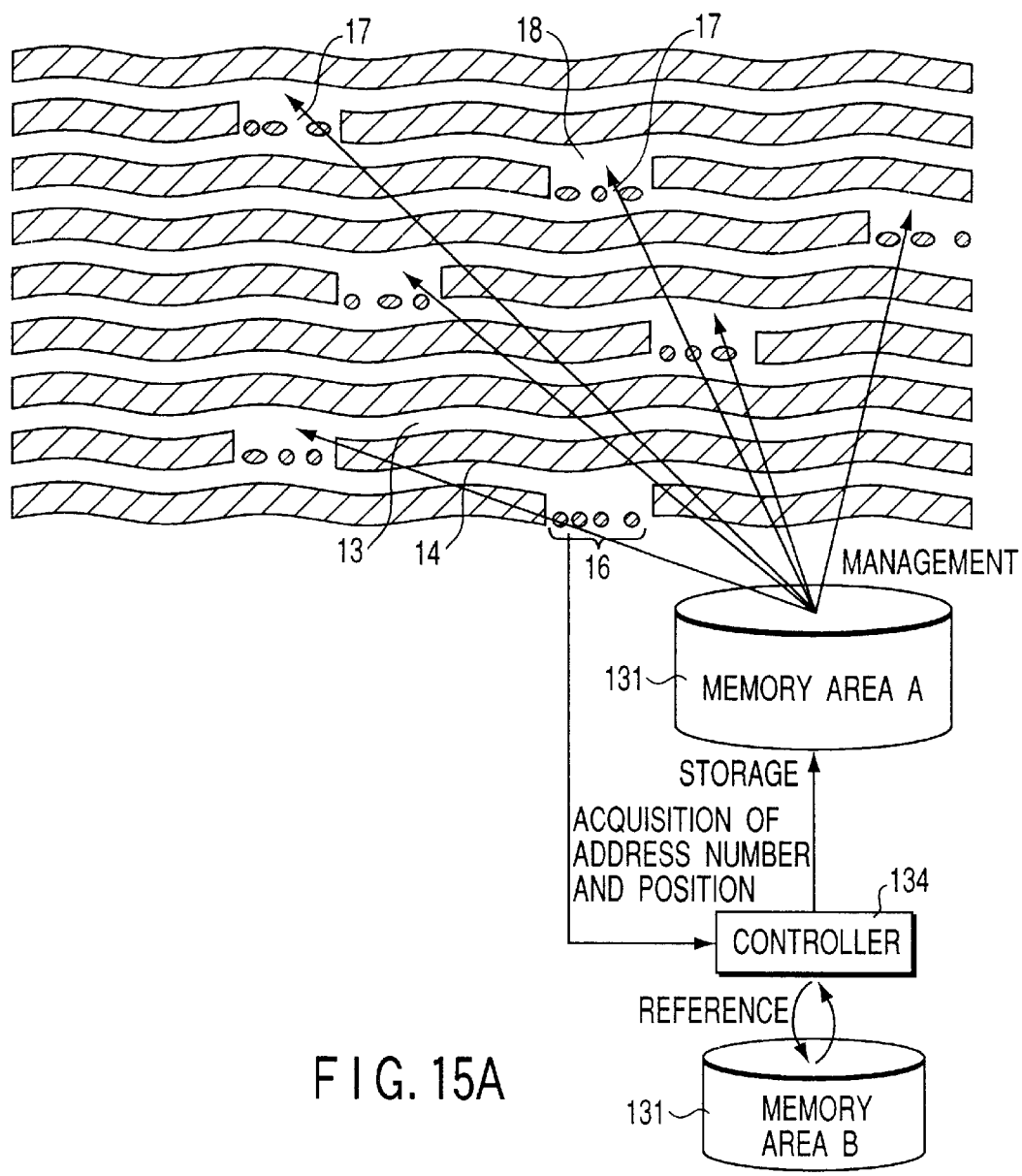
FIGS. 15A and 15B are views for explaining a method of managing the positions of land track partial regions by using a memory in this embodiment.

A method of managing the positions of the land track partial regions 18 by using the memory 131 will be described below with reference to FIG. 15.

Assume that the relative positions of all the land portions 17 of the groove track separation portions are obtained in advance by, for example, the format method used for the optical disk 10 and stored in a memory area B of the memory 131. In this case, the relative position information (address/position information) of all the land portions 17 of the groove track separation portions may be obtained in advance and stored in the memory area B, or position information recorded by using the embossed pits 16 formed in units of lead-in portions or ECC blocks of the optical disk 10 may be read and stored. Alternatively, such information can be calculated on the basis of the position information in the radial direction of the disk which is discriminated from the ECC block numbers, instead of storing the positions of the land track partial regions 18 as data.

In the CLV (Constant Linear Velocity) scheme of always keeping the distances between the embossed pits on the tracks constant by changing the rotational speed of the optical disk in accordance with the positions of the tracks in the radial direction of the disk, since groove track separation portions appear at different positions on the respective tracks, the positions of all the land track partial regions 18 must be stored. In the ZCLV (Zoned Constant Linear Velocity) scheme or ZCAV (Zoned Constant Angular Velocity) scheme of dividing the entire surface of a disk into zones in accordance with positions in the radial direction and keeping the rotational speed and clock frequency constant on the tracks in each zone, since the relative positions of separation portions of adjacent tracks within the zones always coincide with each other, the amount of position information stored in the memory area B greatly decreases in accordance with the number of zones.

In record/reproduction operation, the optical disk 10 is loaded into the optical disk apparatus, and the spindle motor 121 is rotated. When the rotation becomes stable, focus control and tracking control are started. At this time, data recorded on the optical disk 10 is read by the optical head. When the optical head starts reading the data, reproduction of the first ECC block is complete, and position information indicating the address of the ECC block is reproduced from the embossed pits 16.

The controller 134 acquires the position information of the address of the ECC block and position information such as a position in the radial direction of the disk or a rotational angle, and calculates information about the position of each land portion 17 of all the groove track separation portions by referring to a list of the pieces of relative position information of the land portions 17 of the groove track separation portions which is stored in the memory area B of the memory 131 in the above manner.

The controller 134 then calculates the position of that land track partial region 18 which is adjacent to the land portion 17 of the groove track separation portion obtained in this manner and does not share the embossed pits 16, and stores it in a memory area A of the memory 131. With this operation, the controller 134 can predict the position information of the land track partial region 18 adjacent to the land portion 17 of the groove track separation portion adjacent to the land track 13 on/from which data is currently recorded/ reproduced. The position information is provided as a timing signal based on a rotational sync signal detected from the wobbled pattern.

In accordance with the position information of the land track partial region 18 predicted in this manner, the controller 134 controls the tracking control system to fix the position of a light beam to a predetermined position in the radial direction of the disk while the light beam is positioned in the land track partial region 18, and also performs the following switching control on the operation states of the recording system and reproduction system.

(1) To prevent disturbance of tracking servo control in the land track partial region 18, the tracking control system is set in the hold state to fix the position of a light beam in the radial direction of the disk.

Although tracking servo control is inactivated when the position of a light beam in the radial direction of the disk is fixed in the land track partial region 18, this operation can prevent the position of a light beam from becoming out of control due to disturbance of tracking servo control. In addition, since the light beam passes through the land track partial region 18 in a short period of time, even if the position of the light beam is fixed in the radial direction of the disk, no problem arises. Stable record/reproduction operation can therefore be performed.

Figure 15B:
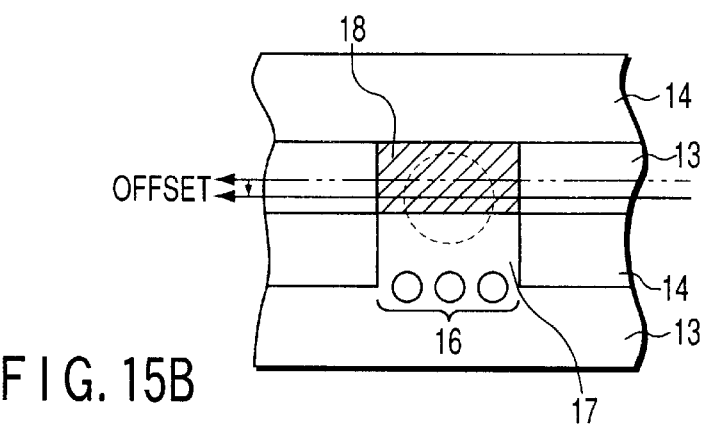

In this case, the position of a light beam may be fixed in the radial direction of the disk immediately before it reaches the land track partial region 18. However, the light beam may preferably fixed at a position offset, by a predetermined amount, from the center of the land track 13 including the land track partial region 18 to the groove track 14 which adjacent to the land track 13 and has a separation portion 17, as shown in FIG. 15B. The reason for this operation will be described later.

The tracking control system may be controlled to be set in the hold state as follows. While a light beam passes through the land track partial region 18, the controller 134 sends a tracking servo interruption command to the servo circuit 132 to interrupt the tracking servo loop and hold the drive current of the lens actuator at a constant value to fix the position of the light beam in a radial direction.

In addition, for example, the light can be offset to a groove track adjacent to the land track partial region 18 by adding a DC offset value of a polarity corresponding to an offset direction to a tracking error signal.

(2) To correct distortion of a record mark in recording on the land track partial region 18, an intensity control signal supplied from the controller 134 to the LD driver 124 is changed to decrease the light intensity of the laser diode 125, i.e., the intensity of a record light beam, by a predetermined value with respect to the normal light intensity set for recording on the land track 13 or groove track 14.

Since one side of the land track partial region 18 in the radial direction of the disk is the land portion 15 of the groove track separation portion, the land track partial region 18 easily diffuses heat generated upon irradiation of a light beam as compared with the land track 13 having the groove tracks 14 formed on its two sides. The record mark therefore tends to distort. This distortion of the record mark leads to a change in shape and an increase in the size of the mark. For this reason, the distortion of the record mark can be reduced by decreasing the intensity of a record light beam in the land track partial region 18.

In this case, the distortion of the record mark can be prevented more effectively by offsetting the light beam to the side of the separation portion of the groove track adjacent to the land track partial region 18, as described in (1).

(3) As described in (2), the record mark in the land track partial region 18 tends to distort. For this reason, in reproduction of data from the land track partial region 18, the reflected light intensity increases due to the distortion of the record mark and the distortion of a reproduction signal increases as compared with reproduction of data from other areas. To prevent this, in the land track partial region 18, the intensity control signal supplied from the controller 134 to the LD driver 124 is changed to decrease the light intensity of the laser diode 125, i.e., the intensity of the reproduction light beam, by a predetermined value with respect to that in reproduction of data from the land track 13 or the groove track 14. With this control, the distortion of the reproduction signal due to the distortion of the record mark can be reduced.

In addition, in the land track partial region 18, the mark center deviates from the track center due to the distortion of the record mark, resulting in an increase in the distortion of the reproduction signal. In this case, as described in (1), such distortion of the reproduction signal can be reduced by offsetting the light beam to the side of the separation portion of the groove track adjacent to the land track partial region 18.

(4) The following processing may be performed instead of the control in (3) or in combination with the control in (3). When data in the land track partial region 18 is to be reproduced, the controller 134 changes the circuit characteristics of the analog arithmetic circuit 133 to perform processing equivalent to control on the light intensity (intensity of a reproduction light beam) of the laser diode 125. More specifically, the controller 134 controls an amplifier in the analog arithmetic circuit 133 to decrease the gain or DC offset amount to be provided for a reproduction signal from the land track partial region 18 in reproduction operation by a predetermined amount, thereby realizing the above control.

As described above, according to this embodiment, the position of that land track partial region 18 which is adjacent to the land portion 17 of the groove track separation portion and does not share the embossed pits 16 is obtained, and the control in (1) and the switching control in (2), (3), and (4) are performed on the basis of the obtained position, thereby performing proper record/reproduction operation even in the land track partial region 18.

Still another embodiment of the present invention will be described next.

Figure 16:
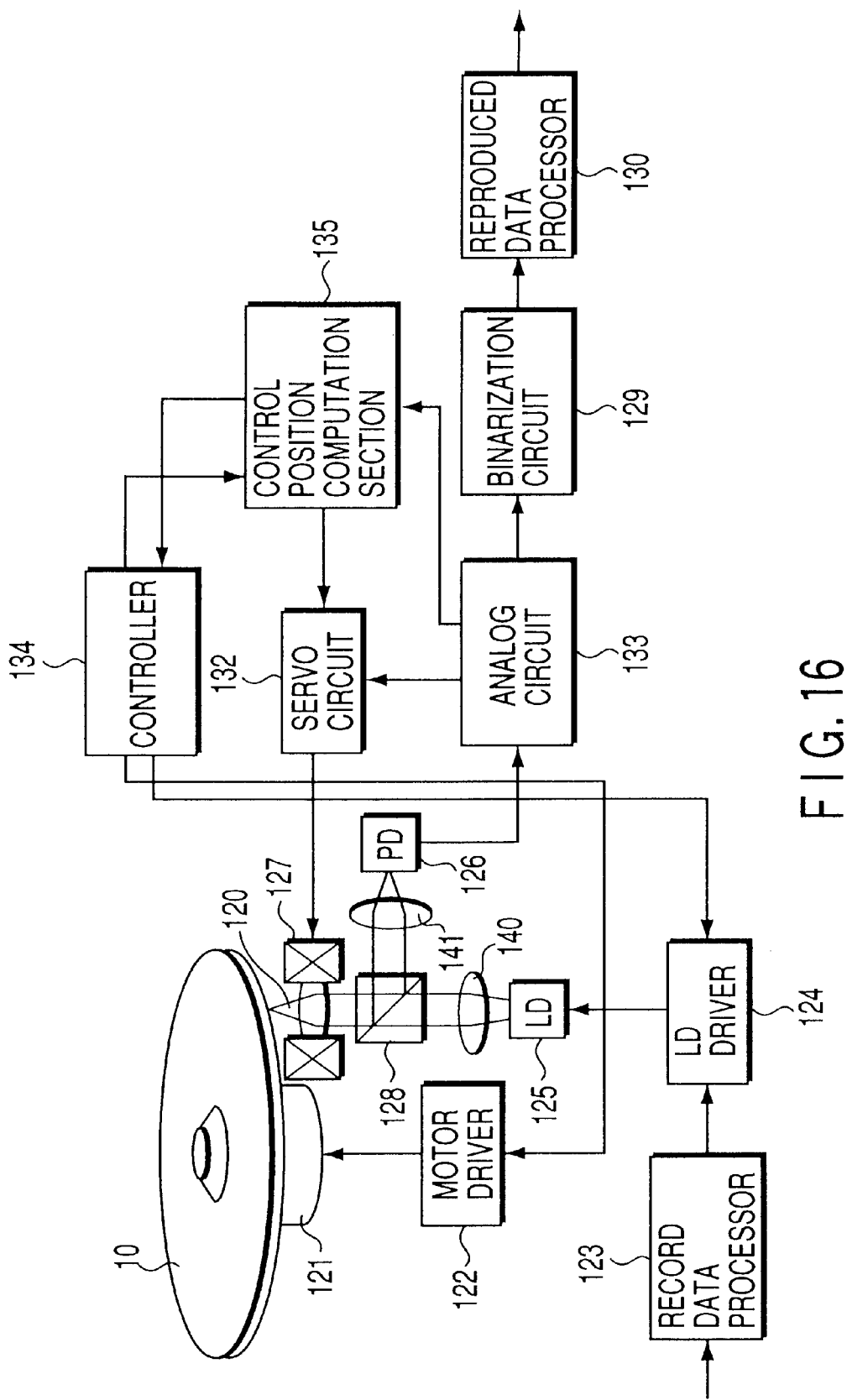
FIG. 16 is a block diagram showing the arrangement of an optical disk apparatus according to still another embodiment of the present invention.

FIG. 16 shows the arrangement an optical disk apparatus according to still another embodiment.

The same reference numerals in FIG. 16 denote the same parts as in FIG. 14. This embodiment differs from the above embodiment in that a control position computation section 135 is used in place of the memory 131 in FIG. 14.

The control position computation section 135 calculates a control position at which the tracking control system should be controlled and switching control should be performed on the operation states of the recording system, the reproduction system, or the like, i.e., the position of a land track partial region 18 of one of land tracks 13, which is adjacent to a land portion 17 of a groove track separation portion and does not share embossed pits 16.

A controller 134 performs control on the tracking control system and switching control on the operation states of the recording system or reproduction system, as in the above embodiment, on the basis of the position information of the land track partial region 18 which is calculated by the control position computation section 135.

Figure 17:
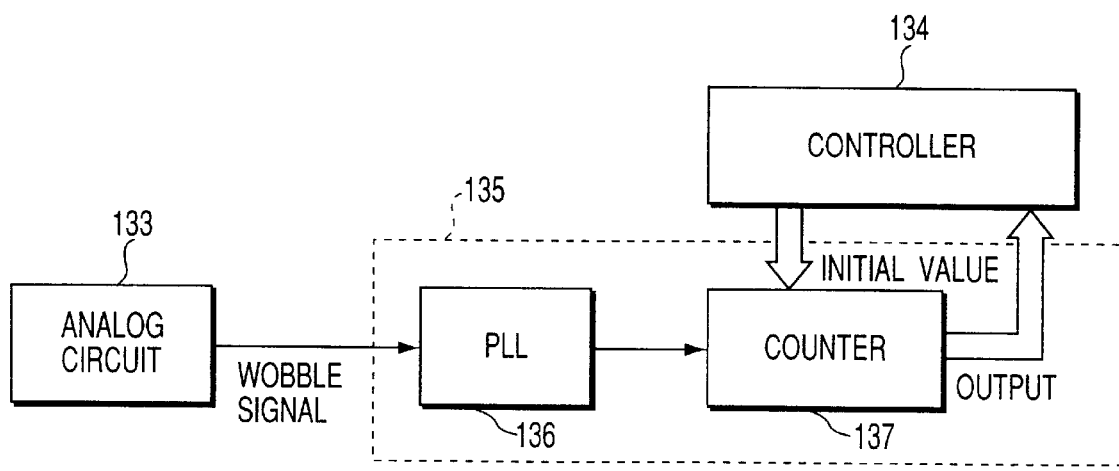
FIG. 17 is a block diagram showing a control position computation section in FIG. 16.

The control position computation section 135 will be described in detail here. For example, as shown in FIG. 17, the control position computation section 135 is comprised of a counter 137 and a PLL (Phase Locked Loop) circuit 136 for generating clocks synchronized with a wobble signal from an analog arithmetic circuit 133. A digital value corresponding to the position of a light beam in the radial direction of the disk which is obtained by the controller 134 is set as an initial value in the counter 137. The counter 137 counts clocks input from the PLL circuit 136. With this operation, a control position (the position of the land track partial region 18) is obtained by the counter 137. The information of this control position is supplied as a digital value to the controller 134.

Figure 18:
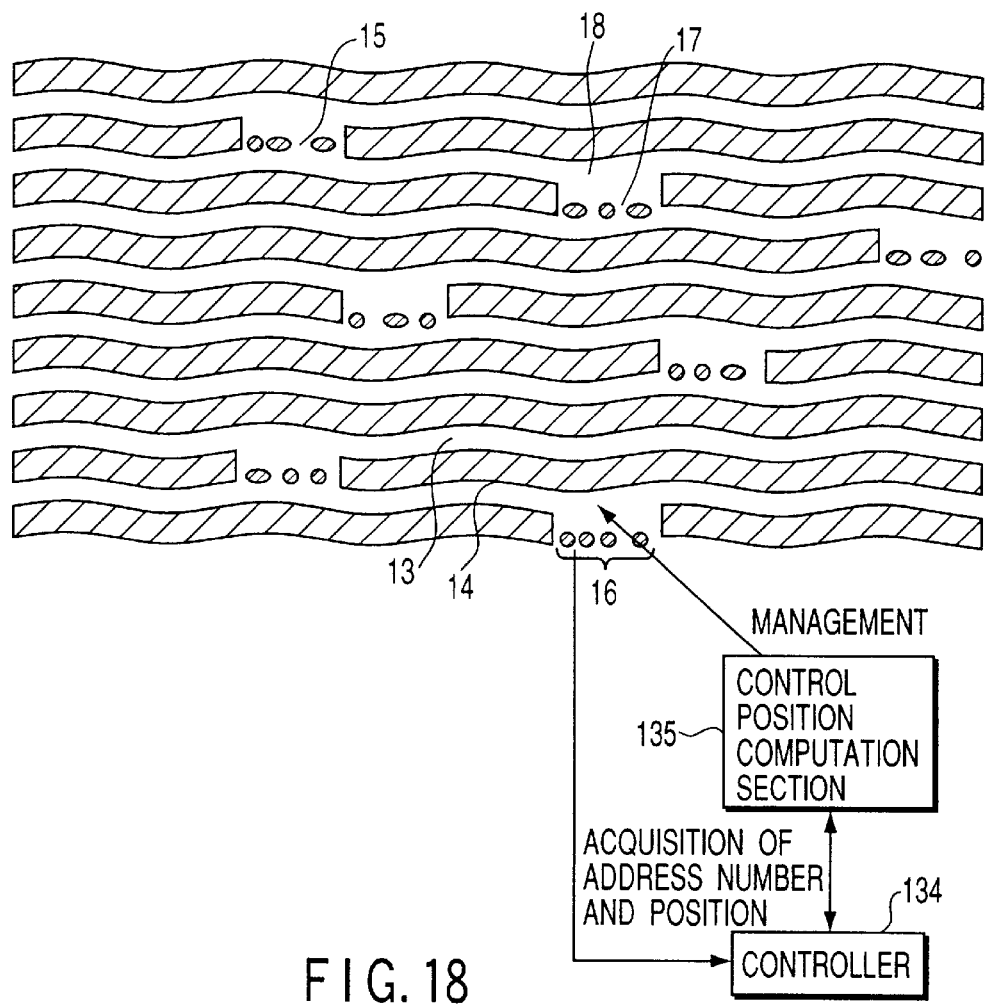
FIG. 18 is a view for explaining a method of managing the positions of land track partial regions by using a memory in this embodiment.

A method of obtaining the position of the land track partial region 18 using the control position computation section 135 and managing it will be described below with reference to FIG. 18.

A method of managing the position of the separated land track partial region 18 of a groove track 14 adjacent to the land portion 17 on the basis of the information of the land portion 17 of the preceding groove track 14 will be described hereinafter. In record/reproduction operation, first of all, a given ECC block is reproduced. When the reproduction of this ECC block is complete, it is known from the format of the record data that the next area to be reproduced is the address portion formed with the embossed pits 16.

The address portion formed with the embossed pits 16 is reproduced in this manner, and reproduction of the next ECC block is started. At this time, the position of a light beam in the radial direction of the disk is obtained by the controller 134, and hence the control position computation section 135 can calculate the position of the land track partial region 18 adjacent to the immediately preceding embossed pits 16, which is reproduced, from the position of the light beam in the radial direction of the disk, i.e., the time at which record/reproduction operation should be performed in the land track partial region 18. Note that the above clocks may be system clocks generated in the controller 134.

When, therefore, the PLL circuit 136 generates clocks synchronized with a wobble signal and the clocks are counted by the counter 137, in which a digital value corresponding to the position of a light beam in the radial direction of the disk is set as an initial value, as shown in FIG. 17, the time at which the count value becomes "0" can be set as the record/reproduction time for the land track partial region 18.

As described above, in this embodiment, the position of the land track partial region 18 which is adjacent to the land portion 17 of the groove track separation portion and does not share the embossed pits 16 is obtained, and the control in (1) and switching control in (2), (3), and (4) are performed on the basis of this position information. Therefore, proper record/reproduction operation can be performed even in this land track partial region 18.

The present invention is not limited the embodiments described above. For example, the position information of the land track partial region 18 which is adjacent to the land portion 17 of the groove track separation portion and does not share the embossed pits 16 may be recorded on the optical disk 10 in advance. More specifically, the position information of the land track partial region 18 may be recorded on a lead-in area of the optical disk 10 or may be recorded as the embossed pits 16 formed in the boundary between the groove track 14 and the land portion 17 of the groove track separation portion.

According to the above embodiments, while a light beam is positioned in a land track partial region adjacent to a groove track separation portion on the opposite side to the side on which embossed pits are formed, the tracking control system is controlled to fix the position of the light beam to a predetermined position in the radial direction of the disk, and control is performed to switch the operation state of at least one of the recording and reproduction systems. This allows stable recording/reproduction of data on/from even a land track partial region.

What is claimed is:

1. An optical disk on/from which data can be recorded/reproduced in units of ECC blocks each constituted by a plurality of sectors, comprising:

a plurality of land tracks and groove tracks which are alternately arranged in a radial direction of the optical disk;

a land portion which is formed on a corresponding groove track of the groove tracks to separate the corresponding groove track of the groove tracks and is substantially flush with the land tracks;

a set of embossed pits which is formed in units of ECC blocks in a boundary between the land portion and one of the land tracks located on two sides of the groove track in which the land portion is formed; and a land record/reproduction interruption portion which is formed in a land data area adjacent to the land portion, the land data area belonging to the other of the land tracks located on the two sides of the groove track and opposing to the set of embossed pits, no data being recorded/reproduced on/from the land record/reproduction interruption portion.

2. A disk according to claim 1, wherein the set of embossed pits represent position information of the ECC blocks.

3. A disk according to claim 1, which further comprises a groove record/reproduction interruption portion which is formed in a groove data area opposite to the set of embossed pits via the one of the land tracks, the groove data area belonging to the groove track adjacent to the one of the land tracks, no data being recorded/reproduced on/from the groove record/reproduction interruption portion.

4. A disk according to claim 3, wherein the ECC block is separated into a plurality of blocks, and the record/reproduction interruption portion is formed between the plurality of blocks.

5. A disk according to claim 4, wherein a logical position at which the ECC block is separated is located immediately before a sync pattern in the data area.

6. A disk according to claim 4, wherein a logical position at which the ECC block is separated is located immediately before sector address information.

7. A disk according to claim 4, wherein a logical position at which the ECC block is separated is located immediately after the sector address information.

8. A disk according to claim 4, wherein each of the plurality of blocks has a buffer area.

9. A disk according to claim 1, wherein the land and groove tracks each have a wobbled pattern formed in a predetermined cycle.

10. A disk according to claim 1, wherein certified processing is performed for at least one of the land and groove tracks to form a predetermined mark thereon.

11. An optical disk apparatus for recording/reproducing data on/from at least one of land and groove tracks on an optical disk in units of ECC blocks each having a plurality of sectors, comprising:

an optical head which records/reproduces information on/from at least one of the land and groove tracks on the optical disk; and a processor which detects logical position information by which the ECC blocks are separated and a record/reproduction interruption portion provided between the separated ECC blocks on the basis of position information obtained by a set of embossed pits formed on a boundary between a land portion for separating a corresponding one of the groove tracks and a corresponding one of the land tracks, and performs a processing of temporarily interrupting recording/reproduction of data on/from the record/reproduction interruption portion, when data of each sector and address information of the sector are recorded/reproduced on/from the optical disk by the optical head.

12. An optical disk apparatus comprising:

a mounting unit which mounts an optical disk having a plurality of land tracks and groove tracks which are alternately arranged adjacent to one another, and a plurality of land portions which are substantially flush with the land tracks and separate the groove tracks, respectively, and a plurality of sets of embossed pits each of which is formed in a boundary between one of the land tracks located on two sides of each of the groove tracks and a corresponding one of the land portions, the sets of embossed pits representing position information;

a driving section for rotating/driving the optical disk;

an optical head which performs selectively recording and reproducing information on/from the optical disk by irradiating the optical disk with a light beam; and a control section which controls tracking so that a position of the light beam is fixed to a predetermined position in a radial direction of the optical disk in a period during which the light beam is positioned in a partial portion of one of the land tracks that is adjacent to another one of the land portions that is on a side opposite to a side of the boundary on which the embossed pits are formed.

13. An apparatus according to claim 12, wherein the control section fixes the position of the light beam in a tracking direction by offsetting, by a predetermined amount, the position of the light beam from a center of one of the land tracks having the partial portion to a side of one of the groove tracks that is adjacent to the partial portion during the period.

14. An apparatus according to claim 12, wherein the control section comprises a switching device which switches an operation state of at least one of recording and reproduction systems in the period during which the light beam is positioned in the partial portion.

15. An apparatus according to claim 14, wherein the switching device performs control to decrease an intensity of a record light beam in the recording system by a predetermined value during the period.

16. An apparatus according to claim 14, wherein the switching device performs control to decrease at least one of an intensity of a reproduction light beam and a gain and DC offset amount provided for a reproduction signal in the reproduction system by a predetermined value during the period.

17. An apparatus according to claim 12, which further includes an arithmetic unit which predicts a position of the land portion on the basis of the position information.

18. An apparatus according to claim 12, wherein the control section comprises a memory for recording position information of the land portion which is predetermined in accordance with a format of the optical disk, and a fixing section which fixes the position of the light beam to a predetermined position on the basis of the position information in the memory.

19. An apparatus according to claim 12, wherein at least one of the land and groove tracks has a wobble pattern formed in a predetermined cycle, and the control section comprises a signal generator which generates a speed control signal in accordance with a wobble signal based on the wobble pattern.

* * * * *